United States Patent [19]
Clauzel et al.

[11] Patent Number: 5,546,396
[45] Date of Patent: Aug. 13, 1996

[54] METHOD AND APPARATUS FOR COMMUNICATING BETWEEN A PLURALITY OF SUBCOMPONENTS

[75] Inventors: Yves Clauzel, Montelimar; Christian Jaeger, Valence, both of France

[73] Assignee: Sextant Avionique, Meudon La Foret, France

[21] Appl. No.: 14,429

[22] Filed: Feb. 5, 1993

[30] Foreign Application Priority Data

Feb. 5, 1992 [FR] France ................... 92 01288

[51] Int. Cl.⁶ .................................................. H04J 3/00
[52] U.S. Cl. ........................................ 370/85.1; 370/85.11
[58] Field of Search ............................ 370/85.1, 85.11, 370/85.9, 85.7, 94.1, 95.1, 60, 84, 85.13

[56] References Cited

U.S. PATENT DOCUMENTS

| | | | |
|---|---|---|---|
| 4,471,481 | 9/1984 | Shaw et al. | 370/85.1 |
| 4,646,324 | 2/1987 | Albano et al. | 370/18 |
| 4,713,806 | 12/1987 | Oberlander et al. | 370/60 |
| 4,965,796 | 10/1990 | Petty | 370/84 |
| 5,163,049 | 11/1992 | Smith et al. | 370/94.1 |
| 5,167,035 | 11/1992 | Mann et al. | 370/85.1 |
| 5,227,778 | 7/1993 | Vacon et al. | 370/85.1 |
| 5,233,607 | 8/1993 | Barwig et al. | 370/60 |
| 5,239,538 | 8/1993 | Teel, Jr. et al. | 370/85.1 |
| 5,249,181 | 9/1993 | Wang et al. | 370/94.1 |
| 5,276,679 | 1/1994 | McKay et al. | 370/84 |
| 5,291,511 | 3/1994 | Maher et al. | 370/85.1 |

Primary Examiner—Douglas W. Olms
Assistant Examiner—Min Jung
Attorney, Agent, or Firm—Hecker & Harriman

[57] ABSTRACT

A processor system and communications processor between a plurality of sub-components is described. To each sub-component of equipment is associated at least one logical channel that is associated with at least one physical channel. Each sub-component addressing only the logical channels that it is associated with, and the various physical channels being time multiplexed on an internal communications bus (BCI). The system has particular application to systems of radio-communication or of embarked navigation.

27 Claims, 12 Drawing Sheets

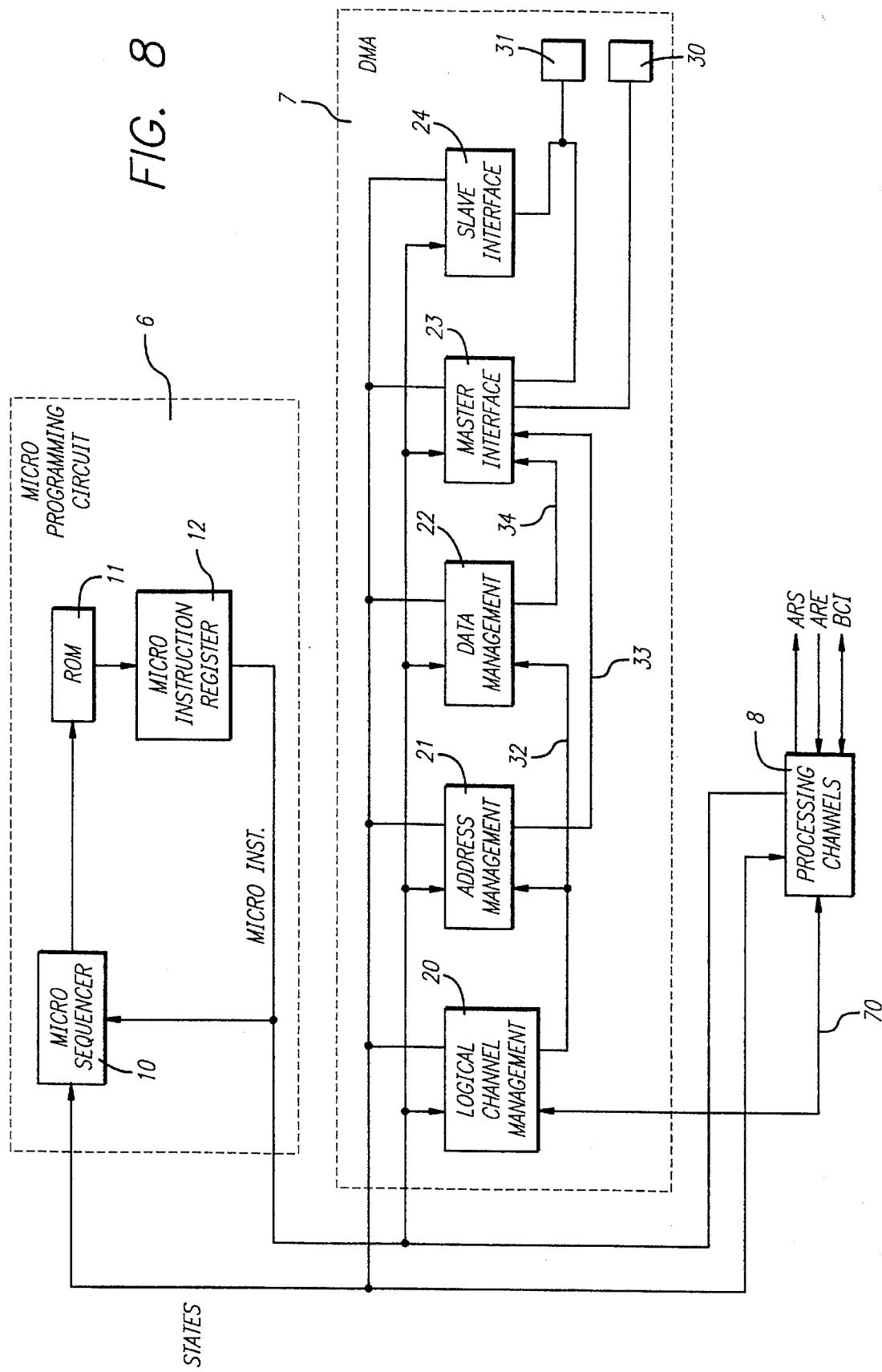

METHOD AND APPARATUS FOR COMMUNICATING BETWEEN A PLURALITY OF SUBCOMPONENTS

BACKGROUND OF THE INVENTION

FIELD OF THE INVENTION

The present invention discloses a process, a system and a processor of communication a between a plurality of sub-components.

Equipment such as systems of radio-communication or of navigation loaded on aircraft have a tendency to comprise an increasing number of sub-components that are themselves increasingly complex and must communicate between themselves. Additionally, these sub-components generally receive information from the exterior of the equipment by intermediary means of input/output lines such as ARINC (Aeronautical Radio, Inc.) lines.

The electrical connections between these different sub-components are thus more and more difficult to produce either at the level of their conception or of their manufacture.

Regarding the conception of these connections, it is in fact necessary not only to consider the constraints with regards to each sub-component, but equally of those with regards to the input/output lines that are generally standardized.

Regarding the manufacture of these connections, it is imperative to try to diminish their volume and their length in order to facilitate their cabling and to diminish their weights.

It is equally desirable that equipment be easily tested and perfected; further, that the sub-components that compose them be interchanged with a minimum of modifications to software that is incorporated.

The present invention attempts to provide the solutions to these problems.

For this purpose, the present invention discloses first of all, a process of transmission of data between a plurality of sub-components of an equipment particularly loaded. The process of transmission of data is characterized by the fact that each sub-component is attached to at least one logical channel. The logical channel is itself attached to at least one physical channel. Each sub-component addresses only the logical channels to which it is attached and the different physical channels that are time multiplexed on a communication bus inside the equipment.

Consequently, when a sub-component transmits data to another sub-component, it addresses neither a particular sub-component nor a particular physical channel of the bus on which the data is time multiplexed. Instead, it addresses only the logical channels that are themselves attached to physical channels. It is thus particularly easy to modify the equipment since new components can be joined to it by taking practically the sole precaution of attaching the logical channels of a new sub-component to the physical channels not yet utilized in the equipment.

The perfection of the tests for equipment utilizing such a process of transmission, moreover, can be easily manufactured given the fact that all the data exchanged between the various sub-components of the equipment are directly accessible on the internal communication bus.

More particularly, at least one sub-component of the equipment may be attached to at least one input/output line. Each data transmitted by a sub-component on an input/output line that is attached to it being additionally transmitted on the communication bus within all the other sub-components. Each data received by a sub-component on an input/output line that is attached to it is re-transmitted on the communication bus within all the other sub-components.

All the data of input/output are consequently available on the internal communication bus for each of the sub-components.

The data are better processed in a parallel manner to the level of the logical channels, and in series form at the level of the physical channels.

Parallel processing at the level of the logical channels is particularly adapted to the fact that a sub-component is very generally organized around a micro-processor. Series processing at the level of the physical channels facilitates multiplexing on the internal communication bus.

In the case in which at least one sub-component is joined to at least one input/output line, all the input/output lines function preferably on a sub-multiple frequency of a basis frequency. The functioning frequency of the internal communication bus being a multiple of the basic frequency.

For example, in the case of ARINC 429 input/output lines that are able to function either at 12.5 KHz or at 100 KHz (that is to say, at a frequency that is a sub-multiple of 100 KHz), the physical channels on the internal communication bus are able to multiplex at a frequency of 10 MHz.

The multiplexing utilized on the internal communication bus consists, in this case, of dividing the duration of one 10 micro-second ARINC bit into 100 pieces of 100 nano-seconds each. By moving each piece to a physical channel and the multiplexing the bits of these 100 channels in the initial interval of initial time on the internal communication bus.

The main interest of this particular procedure thus consists in the fact that before and after the multiplexing, that is to say at the level of sub-components, each channel behaves like a traditional ARINC line.

Existing sub-components may thus be put in place within equipment by preserving the essentials of their original software.

In the procedure of the present invention, one bit of information data may thus be transmitted on the internal communication bus to each instance of a physical channel.

The present invention also describes a system of communication for equipment comprising a plurality of sub-components in which at least one comprises at least one input/output line. All the input/output lines function at a sub-multiple frequency of a main basic frequency characterized by the fact that each sub-component includes at least one communication processor attached to the input/output line. The communication processors are in turn linked between themselves by an internal communication bus that multiplexes a plurality of physical channels at a multiple frequency of the basic frequency.

Each communication processor is consequently linked, on one side, with input/output lines of its sub-component and, on the other, to each of the communication processors of the other sub-components by the intermediary of the internal communication bus. Given the fact, that the physical channels are multiplied at a multiple frequency of the basic frequency of the input/output lines, each sub-component regards, after demultiplexing, each physical channel as one of its own input/output lines.

In a particular embodiment of the communication system according to the present invention, the internal communication bus is a connection to a plurality of cables. A first cable carries a synchronization signal to the basic frequency. A second cable carries a clock signal indicating the changes of the physical channels. The other cables, for example two cables, carry data.

The internal communication bus of the present invention is consequently simple, since it carries no more than four cables of which two are data cables. This permits use of a protocol very close to the standards of ARINC, and particularly to ARINC 429 standard. In the case where the input/output lines are in fact ARINC 429 lines, the signal has a multiple frequency of 100 MHz. The clock signal may then, for example, be a signal that is a multiple frequency of 10 MHz, such as 20 MHz, in order to multiplex 100 physical channels for the duration of one bit of input/output lines.

Each communication processor may possess one counter of physical channels which can be incremented by the clock signal, and be placed at zero by the synchronization signal for determining the numbers of physical channels.

More particularly, each communication processor may possess an internal clock and a phase generator in order to link the incrementation input of its counter of physical channels to the clock cable of the internal communication bus or to its internal clock. The phase generator is equally designed to produce a synchronization signal. Means is designed for the selective linking of the synchronization output of the phase generator to the synchronization cable of the internal communication bus. One of the communication processors of the system has its internal clock linked to the clock cable of the internal communication bus. The synchronization output of its phase generator is linked to the synchronization cable of the internal communication bus. Each processor has the incrementation input of its counter of physical channels linked to the clock cable of the internal communication bus and its zero setting input linked to the synchronization cable of the internal communication bus.

In the case in which at least one sub-component includes one central unit and one memory linked by a local bus, the communication processor of this sub-component is also linked to the local bus.

The performance of this communication processor may then be of the type called "master" when it takes control of the bus for a direct access to the memory, or of the type "slave" when it receives an order from the central unit.

Each central unit may be particularly designed to exchange, on the local bus, information data associated with the numbers of logical channels independent of the physical channels with the communication processor that it is linked to, the communication processor is designed to associate one logical channel of the central unit to one physical channel of the internal communication bus.

Consequently, the central unit of each sub-component addresses only logical channels without it being necessary to preoccupy itself at the level of this unit with the physical channels associated by the communication processor to these logical channels.

The present invention equally has the purpose of providing a communication processor between a plurality of sub-components of equipment characterized by the fact, that it includes:

linkage means to a first sub-component of the equipment designed to exchange data associated with at least one number of a logical channel with the first sub-component;

linkage means to at least a second sub-component of the equipment designed to exchange the data with the second sub-component during the time of successive occurrences of one physical channel, one component of the physical channels following a frequency according to a predetermined order; and association means in order to associate each logical channel to at least one physical channel.

The communication processor, according to the present invention, exchanges with the first sub-component data associated with numbers of logical channels that alone must be known by the first sub-component. It then associates one physical channel to each of these logical channels and multiplexes the physical channels at a frequency and according to a predetermined order.

More particularly, the linkage means to the first sub-component may include a linkage unit to a central unit of the first sub-component as well as the means of direct access to a memory of that first sub-component.

In one particular embodiment of the present invention, the direct access means include means of forming a memory address of the first sub-component at least in the function of the number of the logical channel associated to the data. A memory contains information about the functioning mode of that logical channel, and means to read or write the data of information to the address according to the information on the functioning mode of the logical channel.

Consequently, the communication processor of the present invention associates with each logical channel a memory address of the first sub-component that shall be read or written the data to be transmitted to the second sub-component or, respectively, received by that second sub-component.

The data may thus be read or written in memory sequentially starting with the address thus formed. It functions in a so called ring-like mode, or again, can be read or written to an address formed not only with regards to the number of the logical channel but also with regards to a part of the data exchanged, functioning in a so called stamp mode.

In a particular embodiment of the present invention, the linkage means to the first sub-component includes one exchange memory of which every memory zone is linked to a logical channel. It is designed to contain either data issuing from the first sub-component that is destined to the linkage means to the second sub-component or data issuing from the linkage means to the second sub-component that is destined for the first sub-component according to the functioning mode of the logical channel under consideration and in order to contain an information of request/fulfillment.

The exchange memory consists thus, not only of a buffer memory, but also of a means for permitting the regulation of exchanges of information between the linkage means to the first sub-component and the linkage means to the second sub-component.

More particularly, the communication processor of the present invention may include means for giving a first value to request/fulfillment information when a word originating from these linkage means to the second sub-component has been placed in the memory zone at the disposal of the linkage means of the first sub-component or when a word placed in the memory zone by the linkage means of the first sub-component has been read for transmission to the linkage means of the second sub-component according to the functioning mode of the logical channel associated with the memory zone. The communication processor of the present invention may include means for giving a second value to the request/fulfillment information when the words put at the disposal of the linkage means to the first sub-component has been read by the latter, or respectively, when a new word has been placed in the memory zone by the linkage means to the first sub-component in view of its transmission to the linkage means of the second sub-component.

In the latter case, the linkage means to the first sub-component may include an address counter for the purpose of successively addressing each memory zone of the exchange memory, means for the reading the contents of each memory zone, means for the analyzing of the value of the request/fulfillment information contained in that zone, and in order to stop the address counter when that request/fulfillment information has its first value, and means, in that case, and according to the functioning mode of the logical channel associated to that memory zone, to place in that zone a new word in view of its transmission to the linkage means to the second sub-component or to transmit to the first sub-component the word read, and in order to give its second value to the request/fulfillment information.

The address counter thus permits a scanning of the exchange memory and the treatment of those logical channels for which a request is present.

The linkage means to the first sub-component may moreover include a configuration memory of the logical channels in which each zone is appointed to a logical channel and is designed to contain the necessary information for the treatment of the logical channel by the linkage means to the first sub-component. This configuration memory is addressed in synchronism with the exchange memory.

The configuration memory permits thus particularly the realization of direct access to the memory of the first sub-component.

In a particular conception of an embodiment of the present invention, the association means comprises a counter of physical channels and an association memory in which each memory zone is addressed by the counter of physical channels. The association means is designed to contain at least the number of a logical channel associated with the physical channel corresponding to the value of the counter.

The physical channels follow one frequency according to a predetermined order. Consequently, the counter addresses successively all the physical channels and determines which is the logical channel in course of the processing.

Each memory zone of the association memory, moreover, may be laid out to contain information indicating if the physical channel corresponding to this zone is in fact associated with a physical channel.

It is thus possible to utilize only certain of the physical channels. The duration of the physical channels not being utilized thus used for the processing of the data.

Each memory zone of the association memory, moreover, may contain information about the mode of functioning of the logical channel associated with the physical channel corresponding to the value of the counter.

It is thus possible to directly know at the level of the association means of the mode of functioning of the logical channel associated with a given physical channel, and especially, to know if it functions in either transmission or reception, or in either ring-like mode or in stamp mode.

Within a particular embodiment of the present invention, the linkage means to the second sub-component includes a contexts memory in which each memory zone is allocated to a logical channel and is designed to contain at least one word in the course of processing on the corresponding logical channel.

Each memory zone of the context memory may moreover be provided with a memory location forming a counter to contain the position of the next bit to be processed in the word in the course of processing.

One memory zone of the memory of contexts thus behaves like a shifting register, the position of the next bit to be processed is managed like a counter, indicating the number of shifts already performed.

Each memory zone of the contexts memory can additionally include one memory location capable of receiving the value of the next bit to be transmitted or of the last bit received.

Such a management provides a "pipeline" for the transfer of the data through the linkage means to the second sub-component, thus distinguishing the processing tasks from the transmission asks in order to dispose of the greatest possible time for each of these actions.

Within a type of embodiment of the present invention, the linkage means to the second sub-component includes one processing unit designed to receive at each occurrence of a physical channel data relating to the context of the logical channel associated with that physical channel. This data comprises at least one word in the course of processing on the logical channel and one linkage interface between the processing unit and the second sub-component. The processing unit is designed to keep up to date each of the occurrences of the data relative to the context according to the means of an information exchanged with the interface.

The processing of the logical channels is consequently performed word by word. The processing unit keeps up to date the context of the logical channel processing a particular word during the exchange of that word with the interface.

The processing unit of the linkage means of the second sub-component may equally be linked to the linkage means of the first sub-component by means of an exchange memory in which every zone of memory is allocated to a logical channel and is designed to contain words of data to be exchanged with the linkage means to the first sub-component and a request/fulfillment information, and a linkage interface between the processing unit and the second sub-component. The processing unit is designed, during the request/fulfillment information to a certain value, to exchange a word of data with the exchange memory and to give another value to the request/fulfillment information, and in order to, according the context of the logical channel, transmit the exchanged word to the interface or to receive from the interface a new word to be exchanged.

Here again, the processing is consequently carried out word by word at the level of the exchange memory. The processing unit forms a request when a word to be transmitted to the interface has been read in the exchange memory or when a word transmitted by the interface has been written in a exchange memory. The linkage means to the first sub-component fulfills the request when a new word has been placed in the exchange memory for transmission to the interface or when a word originating from this interface has been read into that memory.

The linkages between the processing unit and the memories are preferably parallel linkages, whereas the linkage between the processing unit and the interface is a series linkage.

In a particular conceptual embodiment, the context and exchange memories are addressed by an output register of one association memory that is itself addressed by a counter of physical channels.

The communication processor, according to the present invention, can advantageously include linkages to at least one output/input line.

In a particular conceptual embodiment, the linkage means to the second sub-component include linkage means to an internal communications bus to the equipment that is designed to carry both the data and the clock data, and a counter of physical channels to determine from the clock data obtained from the internal communication bus, the number of order within the time of the physical channel present on the internal communication bus.

BRIEF DESCRIPTION OF THE DRAWINGS

FIG. 8 is a diagram illustrating the totality of a communications processor according to the present invention.

In the following description, the input/output lines of the equipment are lines according to the ARINC 429 standard, but lines of any other type, especially according to other ARINC standards, could be considered.

Figure 1:
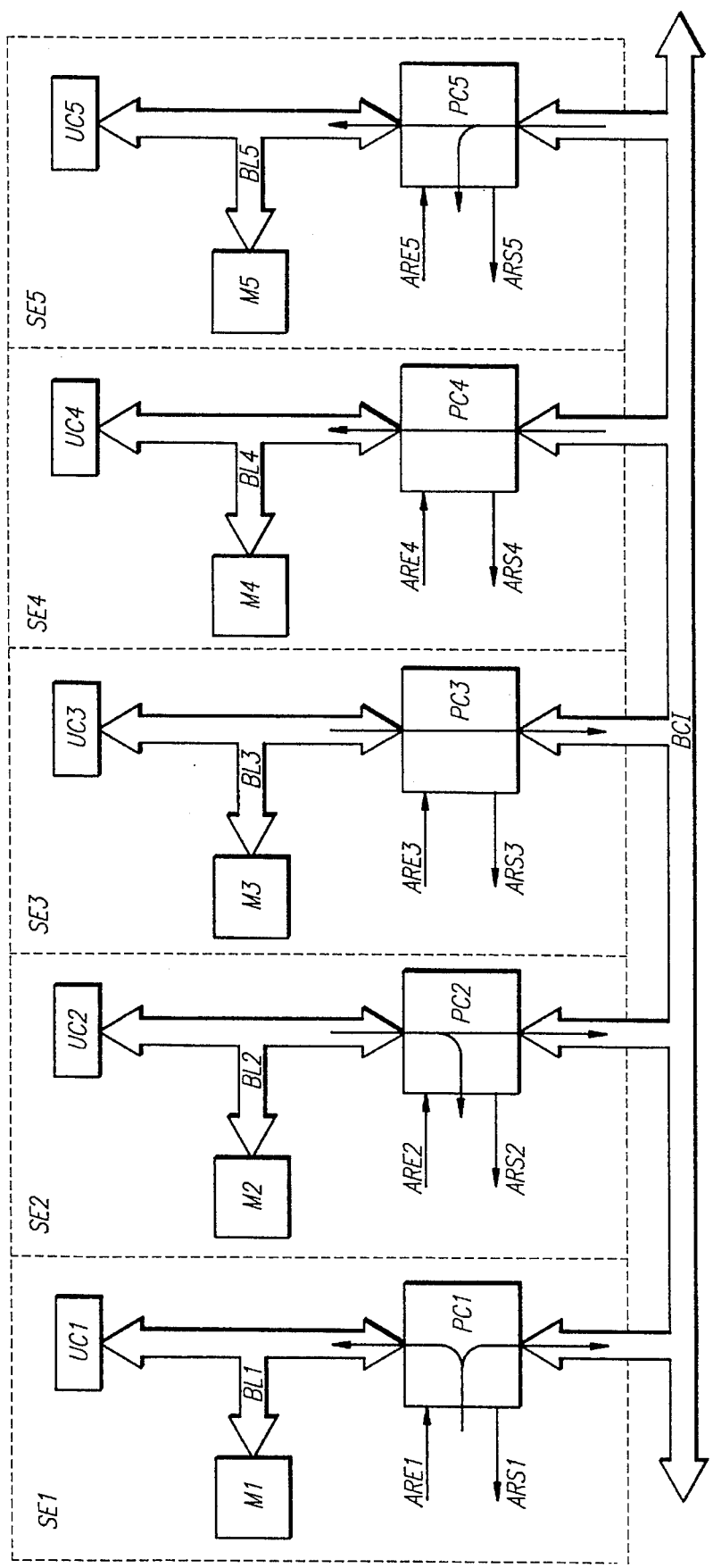
FIG. 1 is a diagram illustrating the totality of an equipment including a communications system according to the present invention.

The equipment represented in FIG. 1 is composed here of five sub-components SE1 to SE5, each including one central unit UCi (for example, of type Motorola 680XX) and memory MI linked by a local bus BLi.

Each sub-component SEi also includes, according to the present invention, a communications processor PCi linked to the local bus BLi. The communication processor PCi also receives in input a certain number of ARINC lines (for instance, dix, AREi), and may exit on a certain number of ARINC lines (for example, six, ARSi). All the communications processors PCi are moreover linked between them by the same internal communication bus BCI.

The various types of communication which one can envision between sub-components, on the one hand, and between ARINC lines on the other are represented in FIG. 1.

The configuration of sub-component SE1 corresponds to a reception on an ARINC line with simultaneous transmission on the bus BCI of the data received.

The configuration of sub-component SE2 corresponds to a transmission on an ARINC line with simultaneous transmission on the bus BCI of the data transmitted on the ARINC line.

The configuration of sub-component SE3 corresponds to a simple transmission on the bus BCI.

The configuration of sub-component SE 4 corresponds to a simple reception on the bus BCI.

The configuration of sub-component SE 5 corresponds to a reception on the bus BCI with the simultaneous transmission on an ARINC line of the data received.

All information transmitted on an ARINC line is equally transmitted on the internal communication bus BCI (case of SE2) and that all information received from an ARINC line is retransmitted to the bus BCI (case of SE1). The internal communication bus BCI is a background series bus on which are multiplexed 96 physical channels. One physical channel being able to transmit either information of an ARINC line or internal information from sub-component to sub-component.

The transmission speeds specified by the ARINC standard apply in fact well to the long distance communications. However, in the case of a background bus, the distances to be traversed being much shorter, therefore it is possible to adopt a much higher frequency.

In the present case, the duration of one ARINC bit of 10 micro-seconds is divided into 100 pieces of 100 nano-seconds each. Each piece is allocated to a communications channel and multiplexes the bits of these 100 channels on the internal communication bus.

In fact, for practical reasons, the number of channels is fixed to 96. The duration of four channels are consequently not utilized for communication.

The internal communication bus BCI is here a linkage with four cables.

Figure 2:
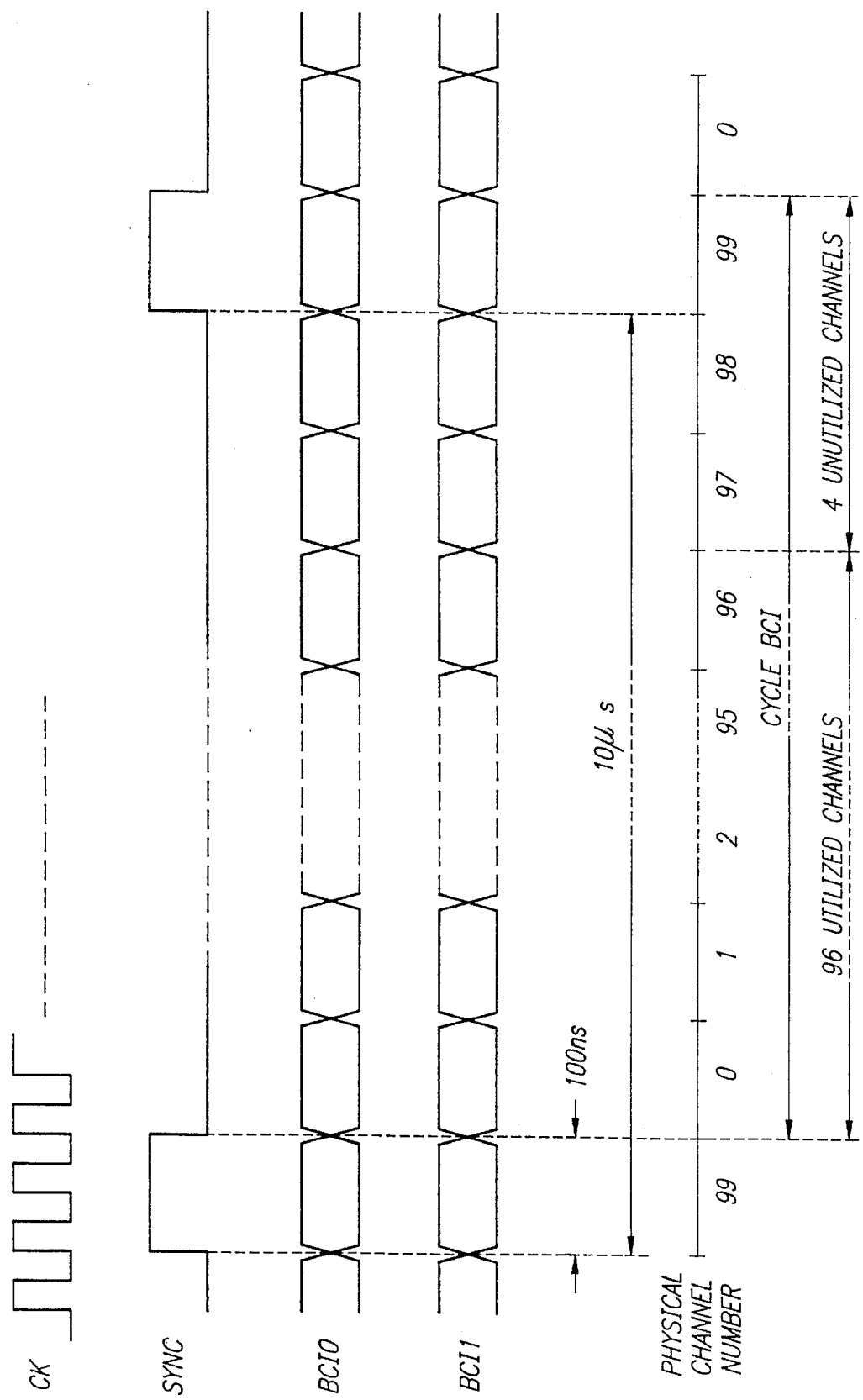
FIG. 2 is a timing diagram of the signals appearing on the internal communication bus.

FIG. 2 represents the timing diagrams of the signals observed on these four cables.

The cable CK transmits a clock signal at 20 MHz that indicates the changes of channel (one channel during two cycles of the clock or 100 nanoseconds).

The cable SYNC supports a synchronization signal constituted by one impulse for the ten microseconds signaling the arrival of a zero channel.

Lastly, the cables BCIO and BCI1 transmit information data with the conventions of table 1 below.

CHART 1

| BICO | BIC1 | (Meaning) |
|---|---|---|
| 0 | 0 | GAP (no data) |
| 0 | 1 | logical "1" |
| 1 | 0 | logical "0" |
| 1 | 1 | BID (bit already transmitted) |

The value GAP has the same meaning as in normal ARINC In this standard at least four GAPs separate words of 32 bits.

The value BID indicates the absence of a bit in the middle of a word without being interpreted as a GAP. Such an absence of a bit occurs if information is retransmitted on the bus of internal communication faster than is received. This is the case for example when one receives on one ARINC line at 12.5 KHz with re-transmission on the bus of internal communication at 100 KHz. This is also the case when for receiving on an ARINC line at 100 KHz–1% with re-transmission on the communication bus at 10 KHz+1% (sliding of frequency authorized by the ARINC standards). In the case where the input/output lines are ARINC lines, it is understood that the value of BID is never found on these lines, but only on the internal communication bus BCI.

Each processor communication PCi exchanges information with the central unit associated UCi by means of the memory Mi on the logical channels which are associated with each type of information. The central units UCi know only the logical channels on which they transmit or receive information The association between logical and physical channels is carried out only at the level of the communications processors.

In the present case, each communications processor can manage 32 logical channels by associating each of those channels with any of the 96 physical channels of the internal communication bus BCI provided a logical channel is not allocated to several physical channels.

The logical channels 0 to 15 are each associated with one ARINC line that may be utilized for communications with the exterior of the equipment. Channels 0 to 9 are utilized in reception and channels 10 to 15 are utilized in reception. The linkages between the ARINC lines of input AREi used for reception and the ARINC output lines ARSi used for emitting are carried out by the ARINC couplers of known type.

Consequently a channel is constituted by the totality of the resources necessary for the establishment of communications. These resources described in detail hereafter may be material (register, ARINC lines, internal memories of the communications processor) or software (describer, stamp memories).

A channel is designated by the objects that it relates at the level of the equipment. Its physical number at the level of the internal communication bus (tests, perfecting process) or again, by its logical number at the level of the function of a sub-component, and particularly at the level of the central units UCi that, as has been mentioned before, know only this logical number.≈he exterior of the equipment, channels 0 to 9 being utilized in reception and channels 10 to 15 being utilized in reception. The linkages between the ARINC lines of entry AREi utilized in reception and the ARINC exit lines ARSi utilized in transmitting, are carried out by the ARINC couplers of known type.

Consequently one understands, that a channel is constituted by the totality of the resources necessary for the establishment of a communication. These resources described in detail hereafter, may be material (register, ARINC lines, internal memories of the communications processor) or software (describer, stamp memories).

A channel is designated by the objects that it relates at the level of the equipment. Its physical number at the level of the internal communication bus (tests, perfecting process) or again, by its logical number at the level of the function of a sub-component, and particularly at the level of the central units UCi that, as has been mentioned before, know only this logical number.

A logical channel may be inactive, that is, selectively disabled or rendered inactive by a command from the central unit. Alternatively, a logical channel may be active.

In the latter case, it may be operational. All the resources are ready and that information is received or transmitted on the channel, or suspended, all the resources being ready but no information being either received or transmitted.

The software of the central units include commands which permit it to evolve the state of a logical channel in a manner that suspends the communications on a channel and to resume them later on without any modification of the parameters (in the case where the transmission or the suspension is automatic), or to deactivate a channel in order to dynamically modify its program.

Before describing in detail a communications processor, we will now describe one of-the structures of data which are used for its functioning.

Some of this data are internal to the processor of communications while others are placed in central memory.

We will first describe the external data placed in central memory.

This data includes information necessary for the initialization of the processor. This data does not form part of the framework of the present invention, and is not described in detail.

The other data permits the communications processor to manage its associated channels.

The necessary information for the utilization of the 32 channels of a communication processor TCi are contained in 32 consecutive locations of the memory Mi, which constitute the control block of the processor.

Figure 3:
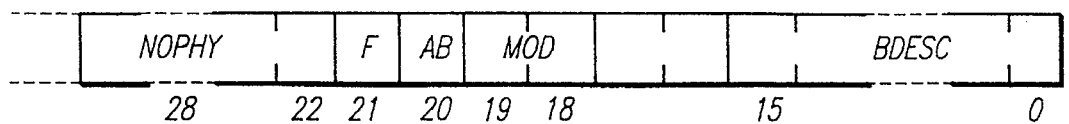
FIG. 3 is a diagram representing the format of a channel control register.

Each memory location of the control block can be represented in a control registry of a logical channel whose format is represented in FIG. 3.

We will hereafter describe only the registration fields of the control channel necessary for the comprehension of the present description.

The bits from 0 to 15 (BDESC fields) contain the basic address of a describer associated with the channel, which shall be described in greater detail hereafter.

The bits 18 and 19 (MOD fields) describe the functioning mode of the channel with the following coding:

00=inactive

01=transmission

10=seal reception

11=ring reception

We will hereafter explain the meaning of the terms seal reception and ring reception.

Bit 20 (AB field) concerns only the logical channels 0 to 15 which possess an ARINC linkage and is at 0 for a linkage with the bus of internal communication alone, and at 1 for a linkage at the same time with the bus of internal communication and with the corresponding ARINC line.

Bit 22 (F field) defines the speed of transmission of the ARINC data and consequently concerns only the logical channels from 0 to 15. This bit is at 0 for a frequency of 12.5 KHz and at 1 for a frequency of 100 KHz.

Lastly, bits 22 to 28 (NOPHY fields) contain the number of physical channel to which is associated the logical channel described by this control registry.

The program of the fields MOD and AB permits, regarding the logical channels from 0 to 15, to obtain the configurations represented in table 2 below.

TABLE 2

| Logical Channel | MOD | AB | Effect |
| --- | --- | --- | --- |
| 0 to 9 | 01 | 1 | Transmit BCI (PC3) |
|  | 01 | 0 | Transmit BCI (PC3) |

TABLE 2-continued

| Logical Channel | MOD | AB | Effect |
|---|---|---|---|
| Receptors | 1x | 1 | Receive ARINC and Transmit BCI (PC1) |
| | 1x | 0 | Receive BCI (PC4) |
| | 01 | 1 | Transmit ARINC and Transmit BCI (PC2) |
| 10 to 15 (Emitters) | 01 | 0 | Transmit BCI (PC3) |
| | 1x | 1 | Receive BCI and Transmit ARINC (PC5) |
| | 1x | 0 | Receive BCI (PC4) |

In this table, "X" means either 0 or 1.

The EFFECT column indicates the state of the communications processor of FIG. 1.

Figure 4:
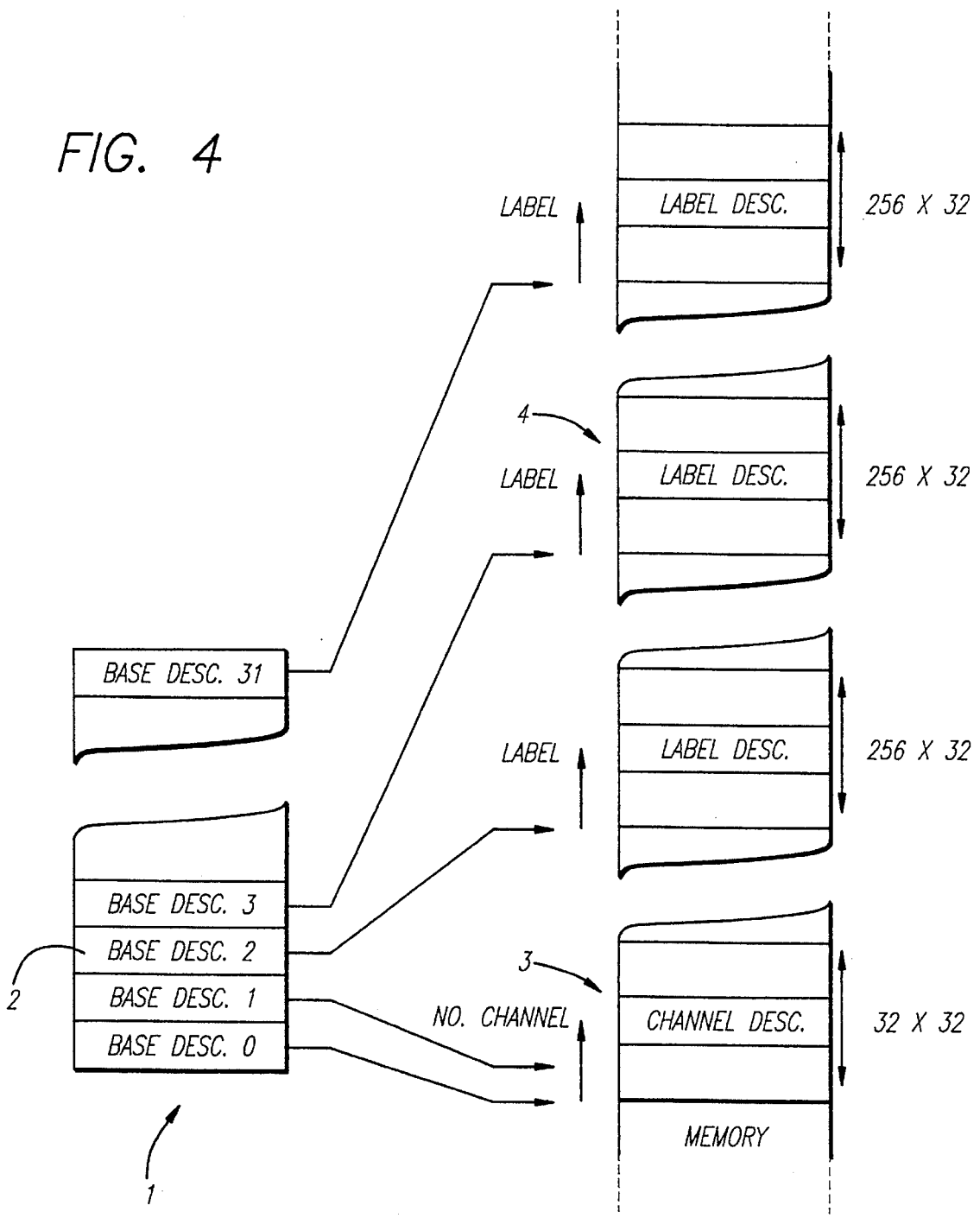
FIG. 4 is a diagram showing the organization in memory of the channels describers in memory.

The field BDESC gives, as indicated above, the basic address of the channel describer associated with each active channel and which is utilized in order to locate the data to be transmitted or the locations before storing the data received. FIG. 4 shows the organization of the channel describers in memory.

A channel describer can have two different formats:

Reception in seal mode:

The channel describer associated with this mode comprises a table of 256 entries indexed by the seal of the occurring word. Each entry of this table constitutes a describer of seal and its format is described below.

Reception in ring mode or emission:

The channel describer associated with these functioning modes includes a single word of 32 bits containing the address of the zone where the data to be transmitted are located, or those of the zone where the received data must be stored. This address is initialized by the central unit managed by the communication processor. Other methods and schemes may also be utilized in the invention.

FIG. 4 illustrates the control block 1 in which each entry 2 constitutes the control register of a logical channel containing among other things, the basic address of the associated describer.

In the case of a channel in the ring mode, the basic address is the one at the beginning of table 3 to 32 entries, the address of the describer of a particular channel being obtained by indexing that table by the logical channel number.

In the case of a channel in the seal mode, the basic address of the describer is address of the table 4 to 256 entries previously mentioned, the storage address of an occurring word being obtained by indexing of that basic address by the seal of this word.

Figure 5:
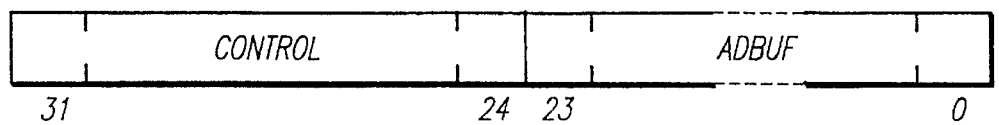
FIG. 5 is a diagram showing the format of a channels describer in stamp mode.

FIG. 5 illustrates the format of a channel describer in seal mode.

The bits 0 to 23 (ADBUF field) contain the location address in memory where the word received is to be arranged in seal mode.

The bits 24 to 31 constitute a group permitting the control of the flux of the ARINC data received according to the SSM (Sign Status Matrix) and to their SDI (Source/Destination Identifier) as well as to manage interrupts.

Figure 6:
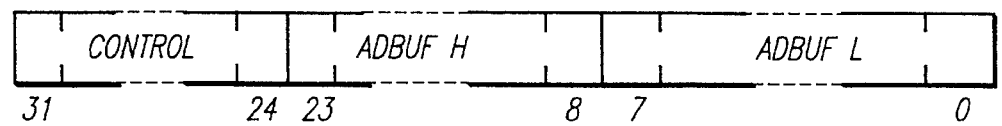
FIG. 6 is a diagram showing the format of a channels describer in the ring mode.

FIG. 6 illustrates the format of a channel describer in the ring form.

Such a channel describer is constituted by one word of 32 bits in which bits 24 to 31 contain information relating to the parity and to eventual interruptions on each word received by the channel being considered.

The bits 0 to 23 (fields ADBUF H and ADBUF L) give the initial address of a memory zone of 256 words of 32 bits utilized in ring form, that is to say, with the automatic return to the beginning when the end of the zone is reached. This address is initialized by the central unit and managed by the processor of communication which increases only its lower part (ADBUFL field) each time an ARINC word has been read or received.

We will now describe the internal data of the communication processor.

This data is contained in a command registry, a registry of the state of the processor and a registry of the state of interruption of the channel.

The command registry is a registry with 16 bits utilized by the central unit to transmit commands to the communications processor.

These commands may refer to the initialization of the processor, to the control of the state of a channel and to the control of the state of a processor.

The initialization commands refer to the transmission to the processor, from the external memory, the totality of the parameters necessary for its functioning, and especially its control block.

The commands of control of the state of a channel aim to make a channel pass from its suspended state to its operational state, or vice versa, or from its operational state to its inactive state, or vice versa.

The commands of control of the state of the processor permit it to mask or unmask the direct access to the memory, in a manner allowing the prevention of a direct access of the communications processor when the central unit accedes to a describer utilized by the communications processor, or when, for time reasons, one wishes to prevent the communications processor to utilize the local bus.

Figure 7:
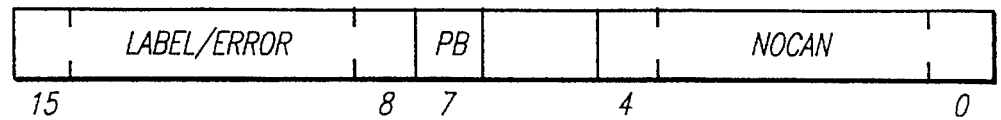
FIG. 7 is a diagram showing the format of the register in a state of interruption of the channel.

The registry of the state of channel interruption is a registry of 16 bits accessible by reading only and containing the information regarding an interruption of the channel type. The format of this registry is represented in FIG. 7.

Bits 0 to 4 (NOCAN fields) indicate the number of the logical channel which has caused the interruption.

Bit 7 (PB field) indicates if the SEAL/ERROR field contains the seal of a word which has caused the interruption or an error code.

Lastly, bits 8 to 15 (SEAL/ERROR field) indicates either the seal or label which has caused the interruption if bit 7 is at 0, or if bit 7 is at 1 an error code being possibly a overflowing in reception (bit 11 at 1), in the case where a word has been received on the channel while the preceding has not yet been written in memory, an error of ARINC format (bit 10 at 1), an error of parity (bit 9 at 1) or an error of bus in direct access to the memory (bit 8 at 1).

We will now describe structure of a communications processor according to the invention referring to FIG. 8.

On this Figure one sees that a communications processor according to the invention includes one part of microprogramming 6, direct access circuits 7 to the memory (DMA) and a unit 8 of processing channels.

The circuit 6 of micro-programming and the circuits 7 of DMA constitute between them a structure of the microprocessing type comprising a path of data (DMA) and a micro-programmed sequencer.

This part performs all the operations relating to the utilization of the external memory Mi, in the same manner as does the associated central unit UCi. We will consequently describe the structure of said circuits in a brief manner, it being understood, that the specialist of the concept of the micro-processors will be able to carry them out on the basis of their function, which shall be described in detail. One should note in addition, that the circuits 6 and 7 could be replaced by a micro-controller different from the processing circuits of the channels 8, in a more flexible, but less integrated design.

The circuits of micro-programming are basically comprised of a microsequencer 10, a ROM memory 11 and its exit registry 12, which have the function to give commands to the totality of the circuit according to the events to be processed.

These commands, or micro-instructions, are contained in the memory 11 and are read according to a certain sequence by the micro-sequencer 10.

The micro-sequencer is in a state of rest awaiting an event to be processed. Its state of rest authorizes the circuits 7 of DMA to explore the memory of exchange described hereafter, in search of a request. Such a request is considered by the micro-sequencer as an event, in the same manner as the writing by the central unit of a command in the command registry, also described hereafter.

Once synchronized by an event, the micro-sequencer feeds the circuit micro-instructions at a predetermined rate, for example, one microinstruction each 100 nano-seconds.

The micro-sequencer 10 can stop itself waiting for a synchronization condition while it delegates the sequencing to another part of the circuit, which is, for example, the case of a direct access to the memory.

In order to carry out its functions, the micro-sequencer addresses the memory 11 in order to read the micro-instruction desired in the registry 12 where it is available for all the elements of the circuits. Moreover, the micro-sequencer 10 is informed about the state of all the other circuits.

The circuits 7 of DMA carry, transform and store parallel data which may be ARINC data originating from input/output lines or from the bus of internal communication, or destined to those input/output or to this bus, addresses or describers.

The DMA circuits are constituted by a block 20 of management of the logical channels, by a block 21 of management of the addresses, by a block 22 of management of the data, by a master interface 23 and a slave interface 24.

The slave interface 24 contains the elements permanently put at the disposal of the micro-processor. These elements are constituted by:

the registry of commands in which the central unit can write at any time, and the associated circuits of decoding permitting to determine the command under consideration in order to allow the pertinent information to pass to the micro-sequencer;

the registry of the state of the processor; and the registry of the state of the interruptions and a memory FIFO which is attached to it. This FIFO memory is a memory of 32 words of 16 bits which is written on order from the micro-sequencer 10 on the basis of information from any source according to the logical channel in the course of processing.

Each time a command is received by the slave interface 24, it transmits information to the micro-sequencer which synchronizes itself by that event and then provides to the different circuits the necessary micro-instructions.

Moreover, given the number of interruptions likely to occur, the registry of the state of interruptions of channels is in fact the exist of the FIFO memory mentioned above, in which are stored the various interruptions generated by the communications processor. If several interruptions are simultaneously pending, this registry presents to the central unit the information concerning the oldest one.

At each reading by the central unit, the memory is shifted and the information presented are lost in order to be replaced by those of another interruption. This functioning permits the central unit to process several interruptions in response to a single request, thus economizing commutations of contexts.

Master interface 23 performs direct access to the external memory Mi. This block possesses an autonomous functioning which, upon request from micro-sequencer 10, permits it to take possession of the local bus, then to carry out the total sequencing of the access whose address is provided by address management block 21, and if the need arises, by the data management block 22.

This block is composed of a data path that contains multiplexers and registers that permit the size of the transmitted data elements to adapt to the environment encountered, and of a sequencer designed as an automaton of finished states which controls the control signals of the bus according to responses which are given to it. At the end of the memory access, a signal is sent to the micro-sequencer which then re-synchronizes itself.

Address management block 21 forms the addresses which the communications processor generates to directly access the memory, such as the addresses necessary for initialization, the addresses of the channel control registers, the addresses of the describer and the addresses of ARINC data.

Block 21 possesses registers that contain elements of addresses or complete addresses and multiplexers that permit it to chain the fields of various data path origins to form the addresses used for direct access to the memory.

Block 21 is not necessarily autonomous, and creates the memory addresses upon orders from micro-sequencer 10.

Data management block 22 is similar to address management block 21, but block 22 creates the data which the communications processor uses to write in memory. As in block 21, block 22 contains multiplexers to create said data by means of concatenating various sources.

Channel management block 20, which constitutes an interface between DMA circuit 7 and channel processing unit 8, shall be described in detail later on. Block 20 comprises a configuration memory of the logical channels containing information related to the DMA processing of each of the 32 logical channels, as well as the basic address of the channel describer and its mode of functioning, information issued from the channel control register of the logical channel under consideration, and in charge of the initialization of the communications processor.

FIG. 8 shows only the linkages between the blocks 20–24 necessary for the comprehension of the present invention.

Master interface 23 is coupled via line 30 to address bus of the local bus, and master interface 23 and slave interface 24 are coupled via line 31 to the data bus of the local bus. The direct access to the external memory Mi is carried out in accordance with the particular specifications to the central unit UCi.

Channel management block 20 is coupled via line 32 with address management block 21 and data management block 22 so that it can transmit to each block the information contained in the configuration memory, as well as the data drawn in the channel processing unit 8.

Data management blocks 21 and 22 are coupled via lines 33 and 34, respectively, with master interface 23 to provide the addresses and data necessary for direct memory access.

We will now describe the functioning of the direct memory access circuit 7.

The functioning of the communications processor, with regards to data to be received or emitted, is dictated by the internal control information issued from the channel control registry, and contained in the configuration memory, and by the external control information linked to describers located in external memory.

When the communications processor needs to access data stored in memory, it first looks to the internal control information. As the need arises, the communications processor makes a request to obtain control of the local bus. Each request of a bus corresponds to an indivisible series of memory accesses. The processor returns to the local bus only at the end of its operations. During an access to the bus, the processor processes only a single piece of data. It returns the bus immediately after, and may request it again after a predetermined period.

Figure 9:
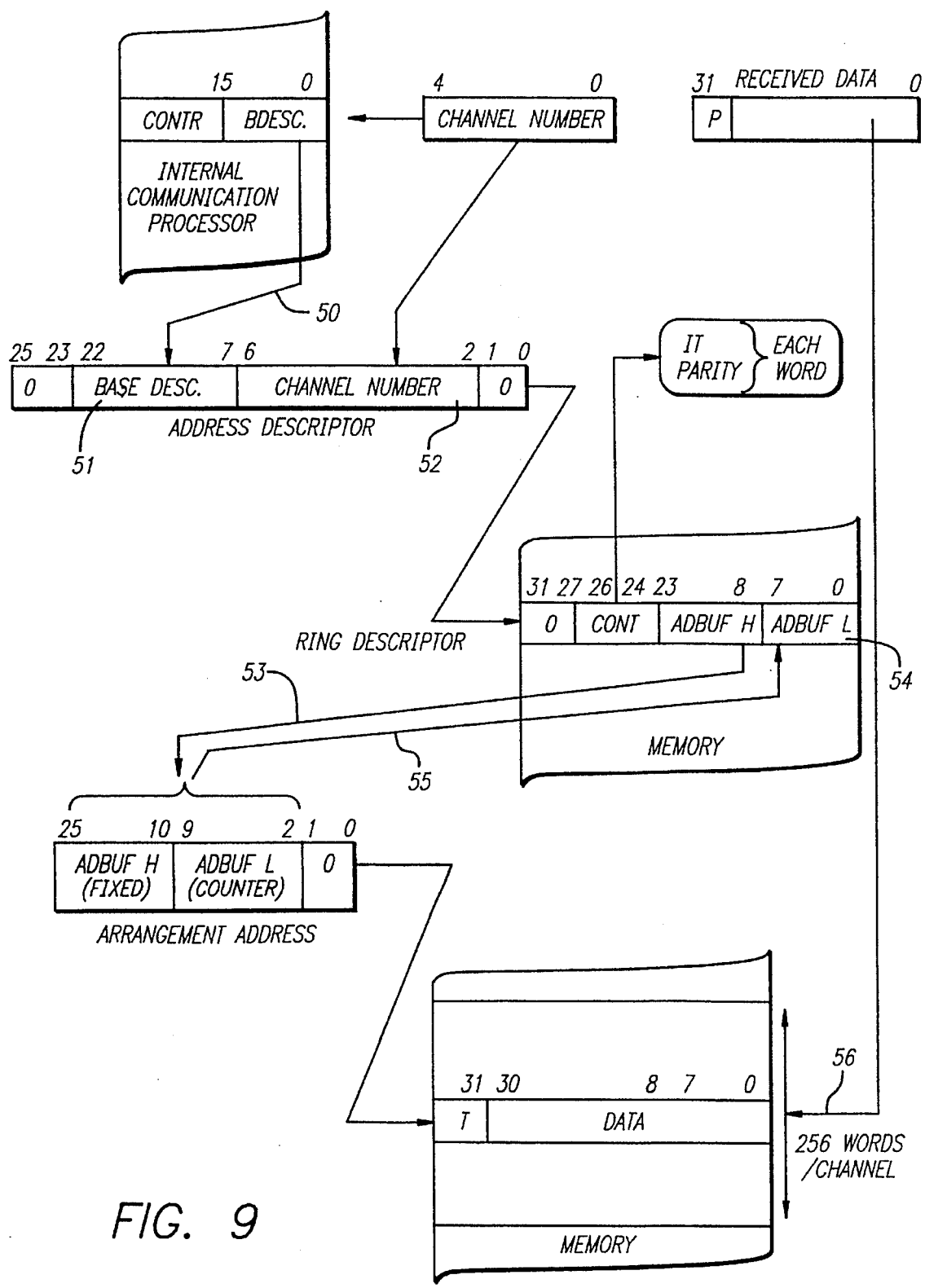
FIG. 9 is a diagram illustrating a DMA access in reception in ring mode.

We will now describe in greater detail a ring mode reception with reference to FIG. 9.

In the ring mode, the communications processor arranges the data received in a memory zone of 256 words in a ring-like manner. The management of the ring causes the intervention of two pointers located in the memory. The writing pointer is controlled by the communications processor and the reading pointer is controlled by the central unit.

When data, is received on the logical channel n (one shall hereafter see how data is associated to the logical channel), channel management block 20 provides (via 50) the basic describer address 51 to address management block 21. With this basic address and the channel number 52, address management block 21 creates the describer address as explained with reference to FIG. 4.

Master interface 23 reads this ring describer via 53. The control information contained in this describer is then used to eventually output an interrupt on each word received, or to control their parity.

In 55, the address contained in the ring describer is then incremented is rewritten in memory.

In 56, the arrangement address extracted from the ring describer is finally used to write the received data to memory.

The indexing of the basic describer address by the logical channel number permits the regrouping of the ring describers within the same memory zone of 256 words.

Each data received in this mode leads to three memory access opportunities to read the ring describer, for the rewriting after incrementation, after having written the data.

Figure 10:
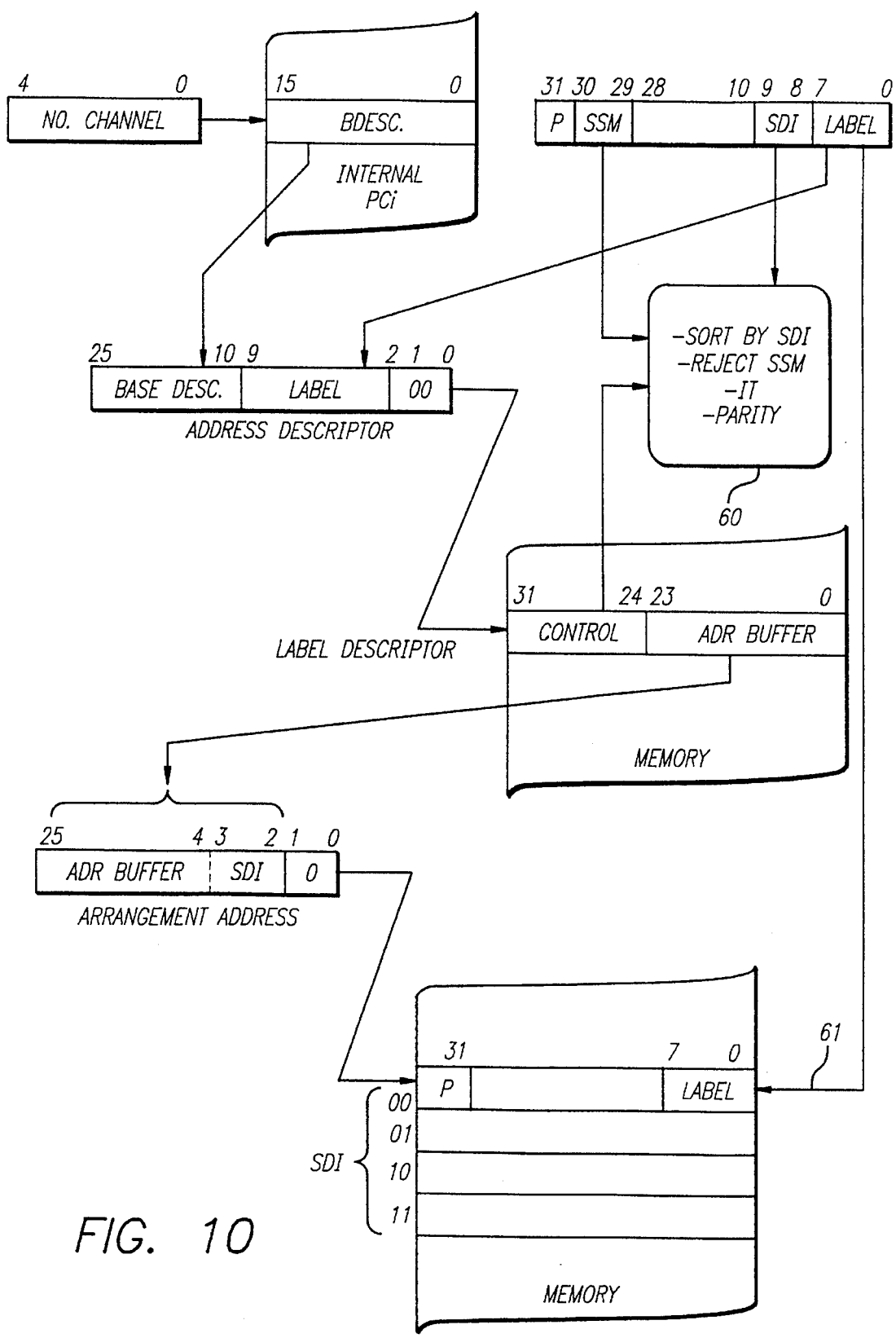
FIG. 10 is a diagram illustrating a DMA access in reception in stamp mode.

We shall now describe a seal mode reception in with reference to FIG. 10.

The channel describer associated with this mode is a memory table of 256 consecutive words pointed to by the BDESC field of the channel control registry.

When an ARINC word is received on the channel n, the describer address is formed from the basic describer address (determined by the number of the logical channel) and the seat of the word received.

In 60, the seal describer is then read into memory and the control information is taken into account.

The seal describer also provides the arrangement address eventually indexed by the SDI of the word received, to which, because in 61, the received word is stored.

Because the seal describers are placed on the borders of the blocks of 256 words, the indexing by the seal of the word received can be carried out by simple concatenation of the seal with the basic describer address.

In the seal mode, each piece of data received brings on two memory access opportunities, one for accessing the seal describer and the other to arrange the data.

In the present conceptual model of the invention, one single mode of transmission is possible based on the same data structure as the reception in ring mode.

Figure 11:
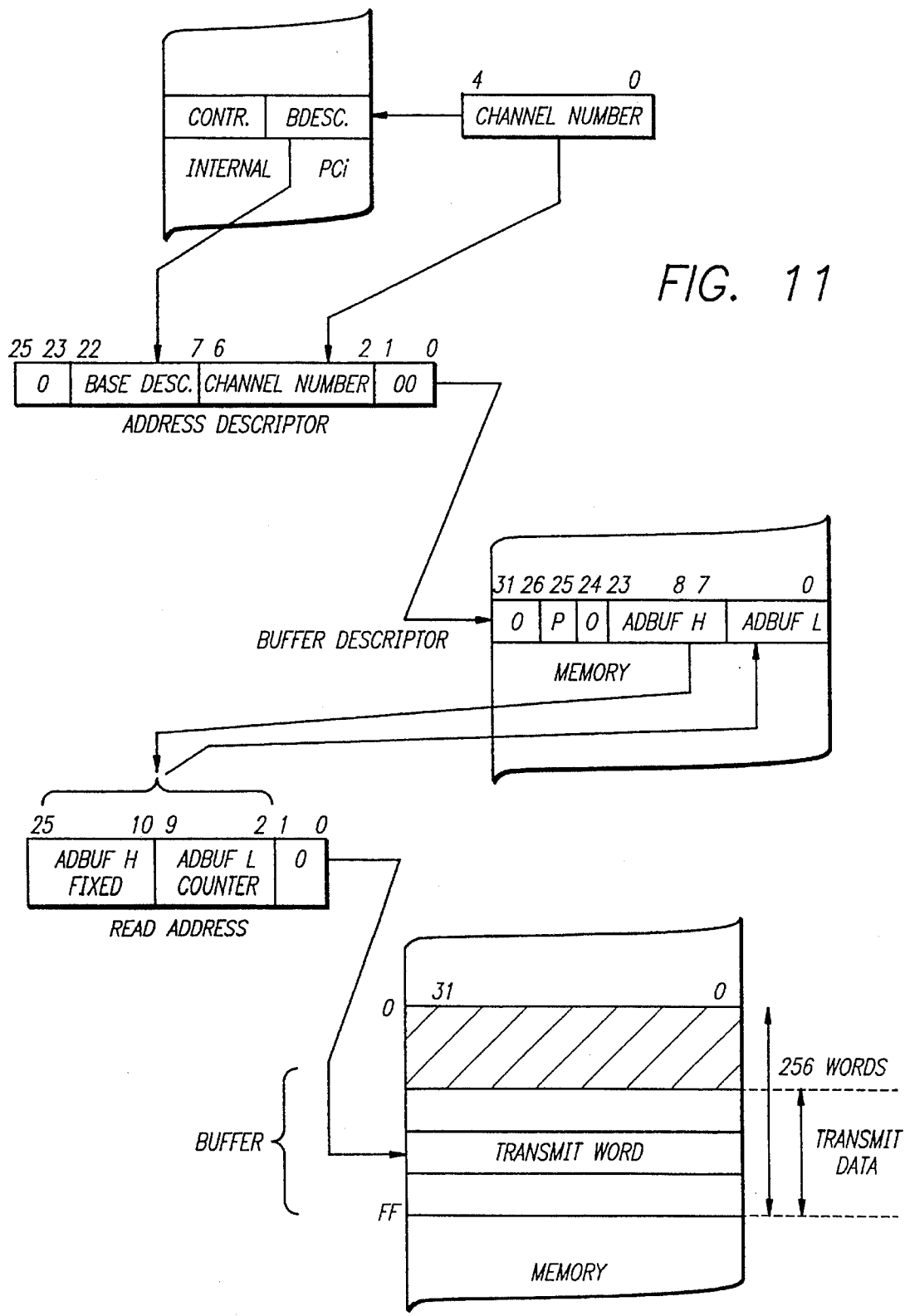
FIG. 11 is a diagram illustrating a DMA access in transmission.

The stages of such a transmission are represented in FIG. 11.

A table of words to be transmitted is placed in memory by the central unit. When it is time to transmit, the central unit sends the communications processor a wake up signal of the desired channel (passing from the suspended state to the operational state).

As before, the channel number on which the transmission is to take place is used to determine the basic describer address which, concatenated with the number of the channel, provides the address of the describer.

The describer is read and the reading address in the table of the words to be transmitted is obtained. That address is incremented and rewritten in the describer of the table. The word is then read and transmitted.

Figure 12:
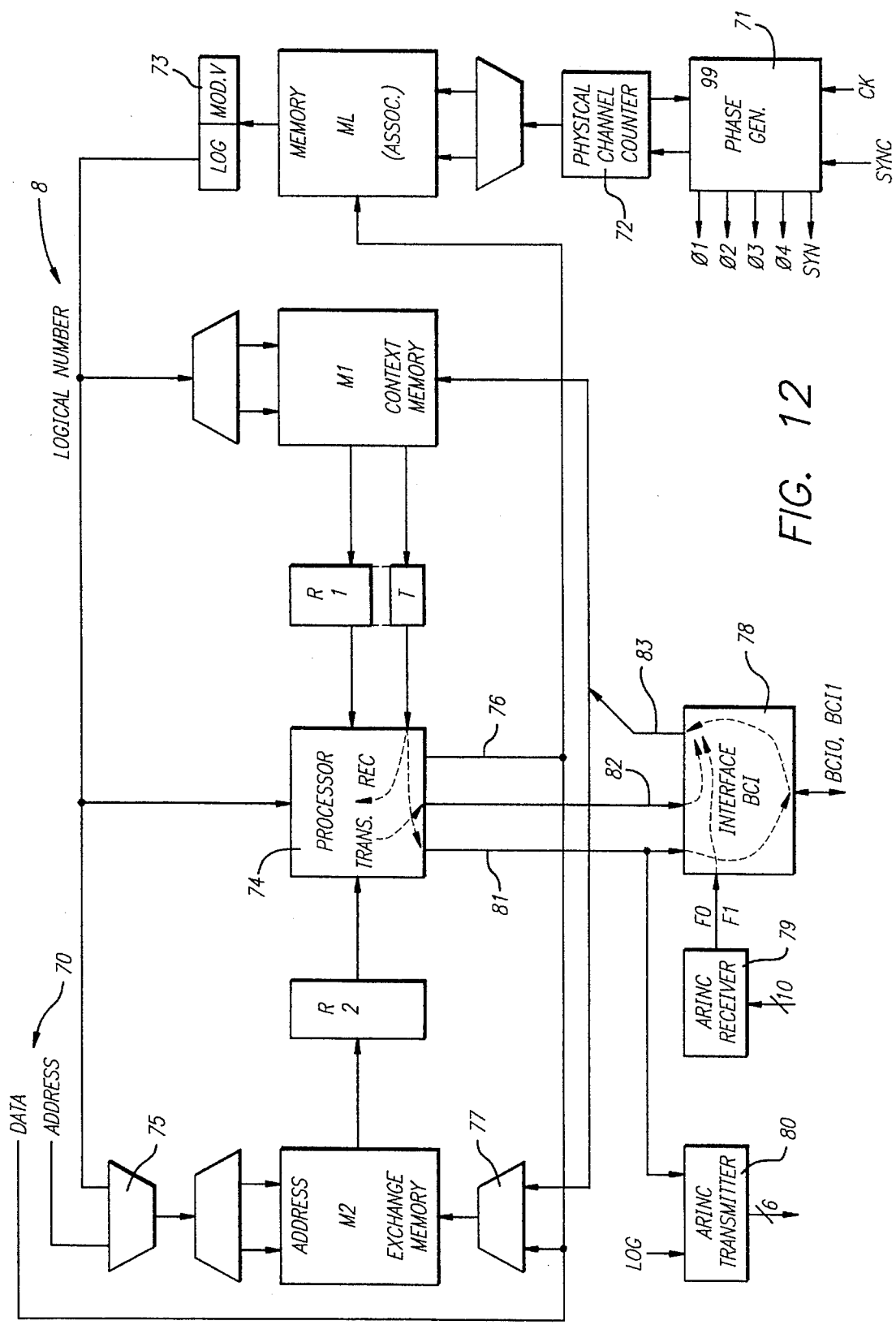
FIG. 12 is a drawing of the processing unit of the channels.

We will now describe in reference to FIG. 12, the channel processing of unit 8.

Apart from the corrections with the micro-program circuits designed to provide them with information about the state, and to receive the microinstructions, the only link of the channel processing unit with the rest of the communications processor consists of addresses and data bus 70. Bus 70 is used for the initialization and use of the entire processor. Once initialized, unit 9 functions simultaneously with the occurrence of the events, one event corresponding to the arrival of one bit on one input/output line or to the passage of a physical channel validly associated with a logical channel.

Because there exist 100 physical channels for 32 logical channels, this unit is inactive during approximately 30% of the time, permitting exchanges with the DMA circuits.

Unit 8 includes a phase generator 71 coupled to the clock and synchronization cables of the internal communication bus to provide the clock signals to unit 8. Phase generator 71 is used to increment physical channel counter 72. Counter 72 addresses an association memory ML permitting the association of one physical channel with one logical channel.

Output registry 73 of memory ML is, in turn, used to address a context memory M1 and an exchange memory M2. The content of output registry 73 is also provided to processing circuit 74.

Circuit 74 receives input upon both the content of registry R1 which is coupled to the output of memory M1, and the content of registry R2 which is coupled to the output of memory M2.

Memory M2 may also be addressed by bus 70 through multiplexer 75.

Processing circuit 74 possesses an output 76 provided upon input of memories M1 and M2. Memory M2 can also receive upon input, data provided from bus 70 through multiplexer 77.

Channel processing unit 8 also includes an interface 78 with data cables BCIO and BCI1 of the internal communication bus interface 79 with said ten ARINC reception lines, and interface 80 with the six ARINC transmission lines.

Processing circuit 74 possesses an output 81 linked to the ARINC transmission lines through intermediary interface 80, and to the internal communication bus by interface 78.

Processing circuit 74 also possesses an output 82 linked to interface 78 to enable the signal from output 82 to return to processing circuit 74 via connection 83 and memory M1.

Connection 83 also couples interface 79 and the internal communication bus to memory M1, through intermediary interface 78. The function of this connection 83 is described later on in the patent.

Figure 13:
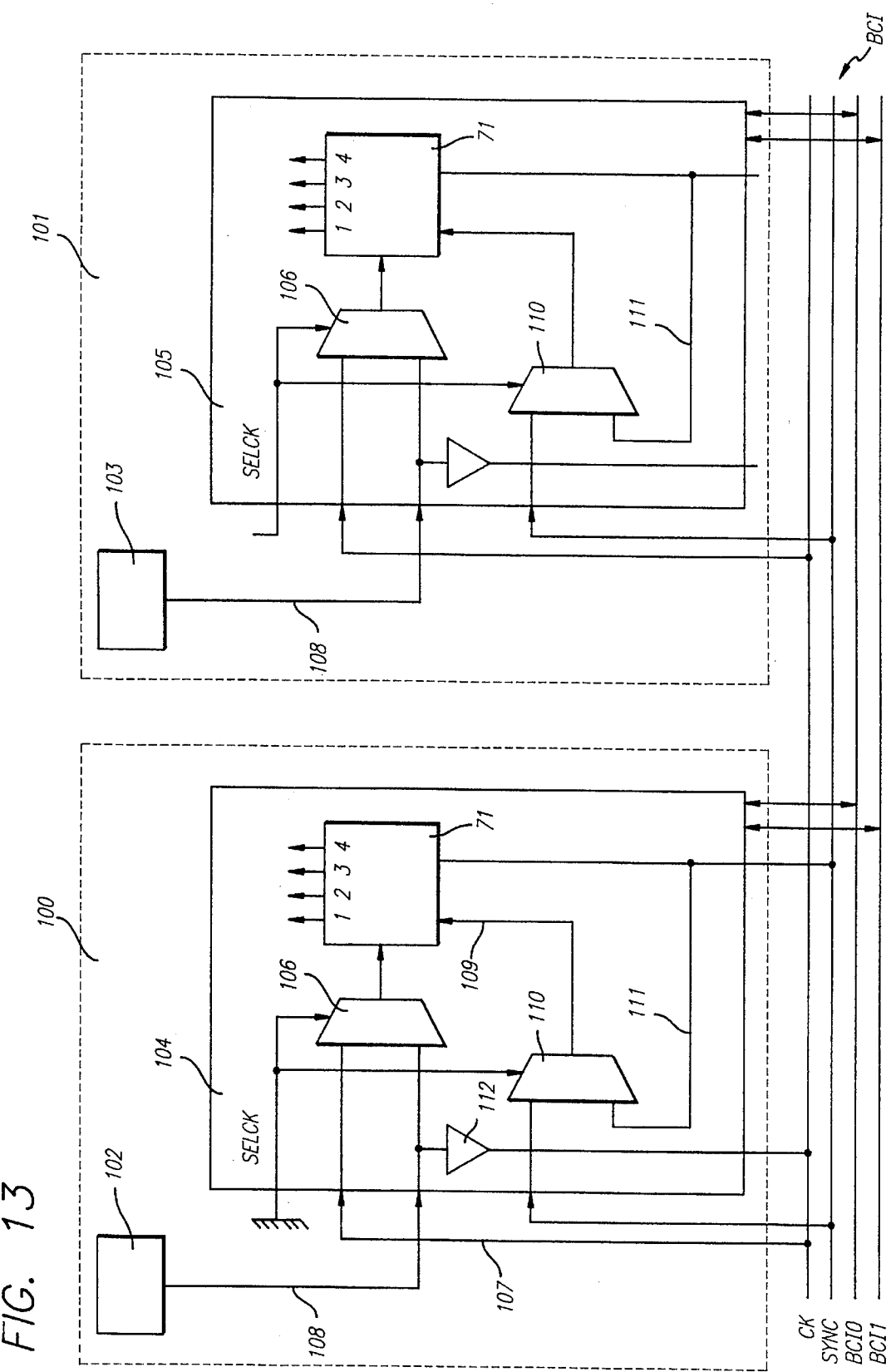
FIG. 13 is a diagram illustrating the functioning of the phase generator of the processing unit.

We shall now describe the environment of phase generator 71 with reference to FIG. 13.

FIG. 13 represents, in a schematic manner, a master communications processor 100 and a slave communications processor 101 connected to the internal communication bus BCI. Each processor includes an internal clock 102–103 respectively, and a clock-managing unit 104, 105 respectively.

Each of these clock managing units includes the phase generator 71 mentioned above, generating a tetra-phased clock of periods of 100 nano-seconds which help to sequence the duration of one physical channel in four instants of processing through the entire circuit.

Each phase generator 71 receives upon entry the output of one multiplexer 106 in which one input 107 originates from the CK cable of the BCI bus, and in which the other input 108 originates from the internal clock 102. The selection of the output of the multiplexer 106 is carried out with the help of its SELCK input, which is programmed at a high level or at a low level.

The phase generator 71 receives also upon input a signal 109, issued from multiplexer 110, which receives on one of its inputs the SYNC signal issued from the bus BCI bus and on another input an output synchronization signal originating from output 111 of phase generator 71. Multiplexer 110 is also commanded by the SELCK signal.

The signal produced by local internal clock 102 can be selectively applied to the CK cable of the BCI bus through an amplifier 112, and in the same way, the signal 111 can be selectively applied to the SYNC cable of the BCI bus.

As has already been indicated, the four clock exits of phase generator 71 are set at the same frequency but 90 degrees out of phase with respect to each other. By contrast, the synchronization output 111 of phase generator 71 has a frequency 100 times less than the clock outputs.

Each communications processor can thus provide a clock signal to the internal communication bus. The choice of which communications processor controls the bus clock depends upon its particular cabling on the bottom of the basket.

The SELCK signal serves to indicate to the communications processor which clock source it must utilize for its sequencing.

If SELCK is at its low level (in processor 100), the processor is in the communication mode, the internal communication bus is operational, the master processor generates the clock signals and of synchronization by cabling. The clock to be utilized is selected by multiplexer 106 and the synchronization signal is selected by multiplexer 110.

If SELCK is at its high level (in processor 101), the processor is in local mode, and internal communication bus is not operational, but the processor can continue to be utilized in ARINC communication. The processor takes its clock 108 locally through multiplexer 106 and its synchronization signal 111, which it makes from the clock, through multiplexer 110.

The SELCK signal thus permits thus a degraded functioning of a particular sub-component in case of malfunctioning signal levels on the internal communication bus.

In FIG. 13, the SELCK signal of master processor 100 is at its low level, as said processor does not have the possibility to reconfigure itself in case of difficulties on the bus. On the other hand, the slave sub-components such as 101 can continue to function.

Looking at FIG. 12, the physical channel counter 72, the logical numbers association memory ML, and its output registry 73 constitute the channel sequencer.

The physical channel counter is incremented at the clock rate and returns to zero at each occurrence of the SYNC synchronization signal. It counts from 0 to 99.

The value of physical channel counter serves to address the memory ML. The latter contains the logical numbers of the active channels within the circuit, in such a manner that if, by programming through bus 70, the logical channel LOG is associated to the physical channel PHY as:

$$ML(PHY-1)=LOG,MOD$$

where MOD represents the functioning mode of the logical channel in question. The MOD field contains the association frequency with an ARINC line and/or the internal communication bus BCI (as shown in Table 2), the receive or transmit mode, and one validity bit V which, if it is at 1, indicates that the association thus formed is valid. The memory ML is a memory of 100 places of which only 32 can be utilized given that the communications processor processes only 32 logical channels. Consequently the bit V permits indication of the locations of the memory ML not utilized.

In the manner in which it is filled up, the memory ML consequently provides to each channel cycle the logical number, if it outputs or exists, of the channel associated to the next physical channel.

Figure 14:
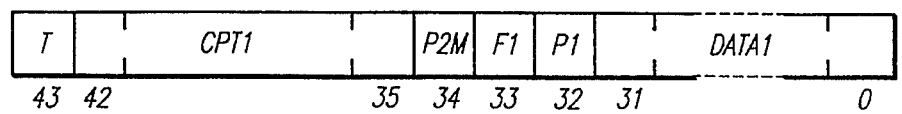
FIG. 14 is a diagram showing the format of the data contained in the contexts memory.

We will now describe with reference to FIG. 14 the context memory MI.

Context memory MI is a memory of 32 words containing the contexts of the 32 logical channels susceptible to being processed by the communications processor.

The context of a logical channel is defined by:
the word being processed;
the position in that word of the following bit to be processed; and
the format or parity error indicators.

A channel context behaves exactly like a shifting register. That is, the position of the next bit to be processed indicates the number of shifts already carried out.

Each word of memory M1 is associated with a logical channel and comprises 44 bits formed by the following fields:

DATA1: a 32-bit channel containing data to be processed and in the process of shifting. The shifting consists for the circuit 74 in rewriting that field after processing with a shifting of the connections with the memory M1. The exiting bit is eventually outputted while the entering bit is constituted by the bit received, according to the mode of functioning.

P1: this 1-bit field stores the current parity calculated according to the value previously stored, and the value of the bit in the course of processing.

F1: this 1-bit field indicates the detection of an error of format during reception. An error of format is produced if it receives more or less than 32 bits for one ARINC word.

P2M: this bit of transmission parity authorization indicates whether bit 31 of the word to be outputted must be replaced by the parity calculated in the course of the transmission process, or whether it must be transmitted without modifications.

CPT1: this field contains an 8-bit counting value which may be considered as representing a 3-bit decimal number after the comma. That value is incremented after each processing of a bit in two different manners according to the frequency of processing (only in transmission). If the transmission is at 100 KHz, the incrementation carries on bit 38 (fourth bit of the counter parting from the weakest bit of weights, that is to say unit bit of the counter), while if the transmission is at 12.5 KHz the incrementation carries on bit 35 (the weakest weight bit of the counter), thus increasing the value of the counter by +0.125. This mechanism prevents having to differentiate the interpretation of the counter according to the frequency. In reception, the counter is always increased by 1, as the frequency of reception does not depend on the communications processor which receives.

T: this bit constitutes the pipeline transference buffer of the internal communication bus. Any bit entering either from interface 79 of reception ARINC, or from internal communication bus, is first transferred within the buffer zone T through connection 83, as well as any bit exiting is issued from zone T, as indicated in FIG. 12 by the dotted lines illustrating the pathway of the data within processing circuit 74 and interface BCI 78, in transmission as well as in reception.

Figure 15:
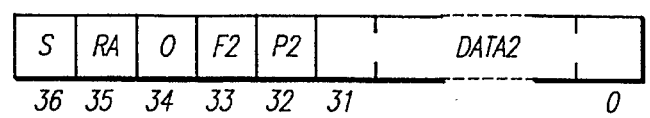
FIG. 15 is a diagram showing the data format contained in the exchange memory.

Now we will describe the exchange memory M2 in reference to FIG. 15.

Exchange memory M2 is a memory of 32 words of 36 bits where all the words travel upon being transmitted or received by the communications processor. Each memory word is associated to a logical channel and contains for that channel the next word to be outputted if it functions in transmission, or the last word received if it functions in reception.

Consequently, memory M2 acts as a buffer between the series processing circuits and the parallel circuits of DMA. In this memory each data of information is associated to a number of logical channel by the location it occupies.

One word of memory M2 contains the following fields:

DATA2: this 32-bit field of data helps transfer the data between the DMA circuits and the context memory M1, in both senses according to mode of transmission or reception. In the transmission sense, this transfer is carried out from bus 70 through multiplexer 77, memory M2, output registry R2 of this memory, processing circuit 74 and bus 76. In the reception sense, this transfer is carried out through output register R1 of memory M1, processing circuit 74, bus 76, multiplexer 77, memory M2, and toward bus 70, as shall be described below.

P2: this bit indicates if the calculation of parity is demanded in transmission, or contains the parity calculated by the processing circuit in reception.

F2: this bit indicates a format error in reception.

O: this bit indicates an overtaking, that is to say, when a word has been received when the previous one has not yet been evacuated from the memory M2 by the DMA circuits.

RA: this request/fulfillment bit is set at 1 by the processing circuit to indicate to the DMA circuits that the memory M2 has been read or written. It is reset to zero by the DMA circuits when the corresponding processing has been carried out, that is to say, in transmission, when a new word has been provided to memory M2, or in reception, when the data zone has been withdrawn.

S: this bit is solely treated by the DMA circuits and the sequencer 10 to memorize the temporary suspension of a particular channel.

Figure 16:
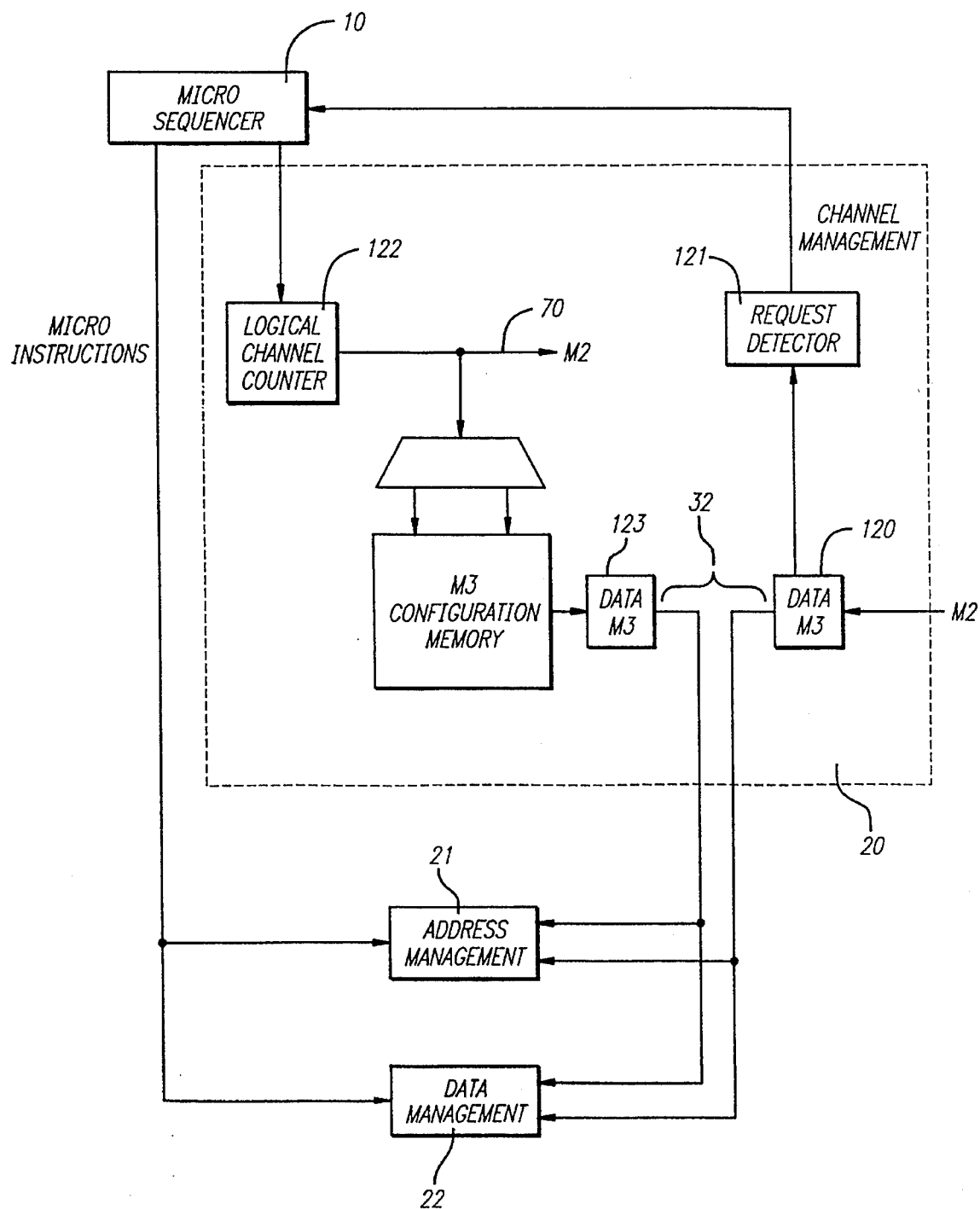
FIG. 16 is a drawing of the administration block of the channels of the DMA circuits.

Memory M2 having been described, we can now proceed to the description of block 20 which manages the circuit channels of DMA, and then the description of processing unit 74 and of the interfaces 78,79 and 80 of the processing unit. This description shall be made with reference to FIG. 16.

Channel management block 20 comprises:

a registry 120 which receives data read in exchange memory M2 of channel processing unit 8;

a request detector 121 linked to register 120 to extract from the request/fulfillment bit and to analyze that bit;

the above configuration memory for the logical channels M3. That memory M3 is a memory of 32 words each associated with one of the logical channels processed by the communications processor. Each one of the words contains the information necessary for the DMA processing of the logical channel which is associated to it, and particularly, the basic address 13DESC of the describer of that channel as well as its functioning mode. This memory M3 is responsible for the initialization of the processor from the control block located in external memory; and a counter of logical channels 122 which increments itself automatically with the authorization of the micro-sequencer 10, according to whether a request has or has not been found within the memory M2.

The function of this component is to explore the memory M2 in search of a request for processing originating from the channel processing unit 8.

To this purpose, the counter 122 generates a logical channel number which is simultaneously utilized as the address of both memories M2 and M3 to enable the reading of the content of each memory's word corresponding to the logical channel under consideration. The addressing of the exchange memory M2 is carried out through bus 70 and multiplexer 75.

This reading is, however, made only when memory M2 is available, that is to say, if the physical channel in course on the internal communication bus BCI is not associated to any of the logical channels of the communications processor (invalid association).

As this condition is being fulfilled, register 120 is charged with the content of the word of the memory M2 corresponding to that logical channel, and the contents of the logical channel's memory M3 is stored in register 123. The contents of register 120 are checked to determine whether a request has been made. If a request has been made, the request is transmitted to the microprocessor 10 which disables counter 122.

If the request is a input request, microprocessor 10 the contents of registers 120 and 123 are stored in address management block 21 and data management block 22.

If the request is an output request, a new word is stored in memory M2. The word stored in memory M2 can be stored in external memory Mi by the DMA circuits.

After processing the request, microprocessor 10 enables the counter 122. Counter 122 resumes its search for request in memory M2. Counter 122 resumes its process of incrementing and polling register 120 for another request.

Logical channel controller 20 and memory M2 provide the interface between the circuits processing parallel data transmitted on the local bus and the circuits processing serial data on the internal bus.

FIG. 12 illustrates the serial interfaces 78, 79 and 80. Interfaces 78, 79 and 80 convert the data input or output by processor 74 into a standard format. For example, the data can be converted into serial data (i.e., format of external bus BCi).

Figure 17:
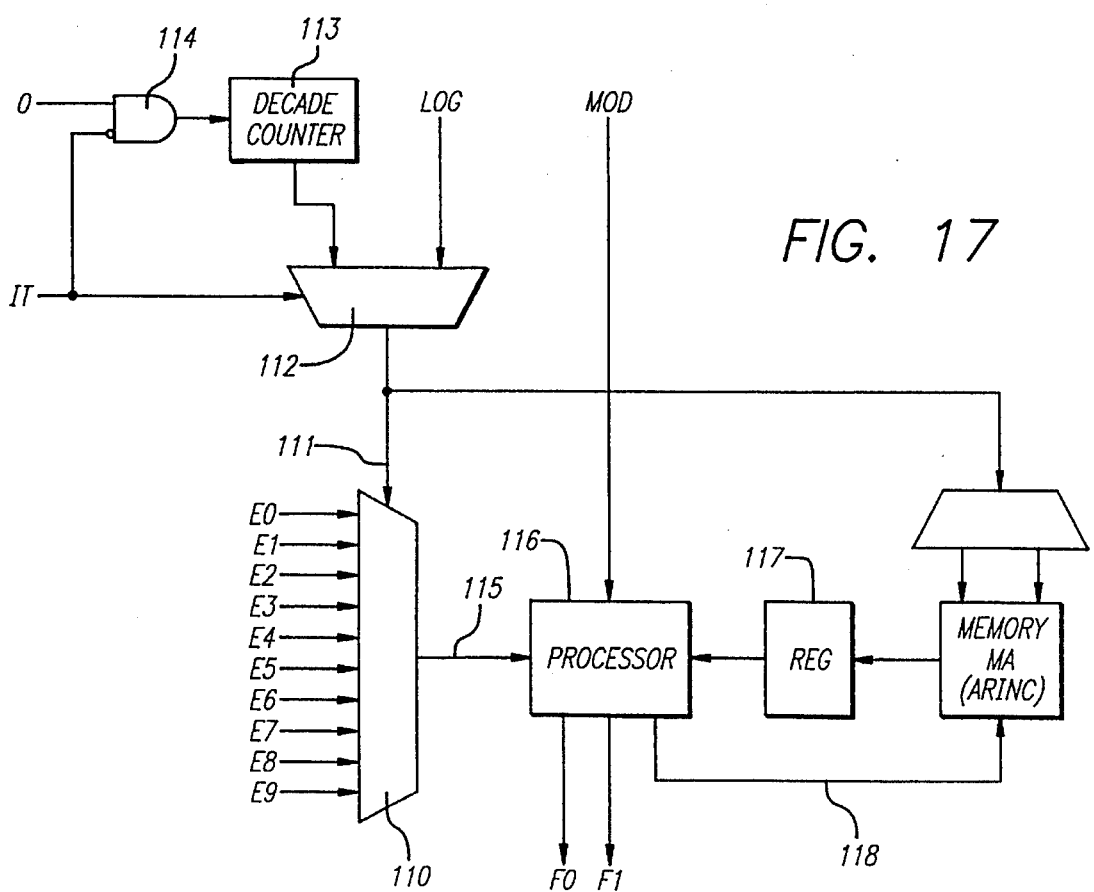
FIG. 17 is a drawing of the interface in reception of ARINC.

Referring to FIG. 17, the input command 111 is transmitted from multiplexer 112 to multiplexer 110 via ARINC input lines E0 to E9.

Multiplexer 112 receives signal LOG (i.e., the logical channel number being processed), the output of a counter by ten 113 incremented by the signal from gate 114 and IT signal. Gate 114 receives a clock signal from phase generator 71, and an inverted IT signal. The IT signal indicates that the counting must be stopped and forces processing of a logical channel associated with an ARINC receiver according to the transmission rate of the corresponding physical channel's bus.

Consequently, if signal IT is low, the counter by ten 113 is incremented at the transmission frequency of the physical channels on the internal communication bus at a frequency of 10 MHz. Further, if signal IT is low, the output of multiplexer 112 corresponds to the output of counter 113.

Consequently, the inputs E0 to E9 are continuously scanned. Further, inputs E0 and E9 are continuously output via output line 115 of the multiplexer 110 during all the microseconds.

Output 115 of multiplexer 110 is coupled to the input of processing circuit 116. Circuit 116 processes information regarding the functioning mode of the logical channel. Circuit 116 receives upon input the contents of register 117, which is coupled to ARINC memory MA. ARINC memory MA is addressed by output 11 of multiplexer 112.

Memory MA is comprised of ten 15-bit words used by the processing circuit 116. Three bits of each word are used as a buffer for received bits. The remaining bits are used to detect the changes of value upon input, as well as counting for the detection of the GAP.

Lastly, the processing circuit 116 has two outputs FO–F1 which are transmitted upon request by the interface BCI 78 of FIG. 12 to the context memory M1 of FIG. 12.

On each occurrence of a particular ARINC input number (equivalent to the logical number of the channel), the value of that input is transmitted to the processing circuit 116 via multiplexer 110. The preceding value stored in memory MA is also transmitted to the circuit 116 via register 117.

These two values are compared, and if no difference is detected, it is assumed that no new value has arrived through the ARINC entrance in the course of processing. One then passes to the following ARINC entrance.

If, on the contrary, a difference is detected, it is assumed, that a new value has arrived and that it is stored in the memory MA through the linkage 118 between said memory and the circuit 116.

The three bits stacking the data of each word in the memory MA are designed to permit an eventual stacking of data, if the data could not be processed in the useful time, because of the tolerance on the ARINC frequencies.

The withdrawing of the data takes place each time the ARINC input number signal is received at the LOG input of the multiplexer 112, which takes place at the rate of the associated physical channel under the control of the physical channel sequencer.

The IT signal then blocks the counter 113 and brings the output 111 of the multiplexer 112 to commutate itself on the LOG input Signal of that multiplexer. The IT signal forces the processing of the input, which processing permits the transmission of the stacked data, if any, via outputs F0 and F1 to context memory M1 and processing circuits 74.

This management consequently performs a sampling of the ARINC entries at the frequency of the counter 113. In the preferred embodiment, a period duration of 1 microseconds. It is, therefore, possible to receive outputs within a range of frequencies from 0 to 500 MHz (see ARINC standards).

The values which are sent on output lines F0 and F1 are:

0 or 1 if a data is present in the memory;

BID if no data is present and a GAP is not yet detected; and

GAP if a GAP is detected.

The detection of a GAP occurs after an absence of data longer than a 1,5 period (ARINC bits), the fractional value being permitted by the sampling principle.

Referring to FIG. 12, interface 80 is connected to the ARINC output lines which presents no difficulty.

The output lines, six in number, are numbered from ten to fifteen corresponding to the logical channels of the same number. The function of a circuit of emission is to store the value provided by the processing circuit 74 if the logical number of the channel in the course of processing corresponds to its own number.

The value stored will then be output at the corresponding output at the moment of occurrence of the synchronization signal SYNC, and shall be maintained for a duration equal to one ARINC half-period at the frequency considered for this exit (12.5 or 100 KHz) in order to sequence the signals in accordance with that which await the external commerce buffers.

This mechanism permits the output of a frequency rigorously equal to the SYNC signal, thus insuring a precision to the emission greatly superior to the 1% required by the ARINC standard 429.

Interface BCI 78 determines, for a given logical channel, the value to be transmitted on the BCI internal communication bus or the value that, originating from that bus, is to be processed at the next occurrence of the logical channel under consideration. That value originating from the internal communication bus from the processing circuit 74, or from the ARINC reception circuits 79, is stored in the buffer zone T as part of the context of the logical channel considered in the contexts memory M1.

This mechanism allows disposable time (i.e., 100 nanoseconds) of a logical channel to be used to perform a simple transfer of the memory M1 of the sending communications processor to the memory M1 of the receiving communications processor. The processing events, advanced (in emission), or delayed (in reception), dispose of the entire duration of the preceding channel or, respectively, of the following channel.

Signal 82 is coupled to BCI interface 78. Signals F0 and F1 of receiving ARINC 79 are coupled to BCI interface 78. Signal 81 is coupled to BCI interface 78. BCI0 and BCI1 are coupled to BCI interface 78. Line 83 transmits signals BCI0, BCI1, 82, F0 and F1. Lines BCI0 and BCI1 transmit signal 81.

We will now describe the processing circuit 74 of FIG. 12.

The circuit receives upon entry the information issued from the association memory ML (logical number of the physical channel and functioning mode of that channel). It also receives the contents of memories M1 and M2 that correspond to the logical channel in process.

Circuit 74 updates the context, after having extracted the bit to be sent or having included the bit to be received, and to replace this context in the memory M1. The bit to be sent is made accessible to interfaces 78 and 80 which transmit it on the internal communication bus, or respectively, on an ARINC transmission.

The processing circuit also transmits a word that has been received to the exchange memory M2, or retrieves a word destined to be transmitted to memory M1 when the preceding one has been transmitted.

We will now describe the function of the processing circuit of FIG. 12 in send mode.

A channel in send mode is initialized with a request in the memory M2. The processing circuit does nothing until this request is completed, indicating the presence of the first word to be sent in the memory M2.

When the word is present in memory M2, the word is retrieved from memory M2 to be placed in memory M1. As previously described, at the same time as a new request is placed in M2 memory, thus giving the DMA circuit the necessary time for the transmission of the word and to supply another.

At the same time as the data to be sent, the information on the calculation of parity (AP) is accessed and placed in M1 memory.

All the other fields of the M1 memory are then placed at their initial value (current parity, counter, buffer zone for the pipeline) indicated in the right column of tables 4 and 5 given below. The effective processing begins at the next occurrence of the logical channel.

In the course of an sending, the word to be sent, is considered to be 36 bits in length given the fact that the ARINC standard establishes at least 4 GAP values between the words.

The processing circuit 74 is idle as long as the decimal part of the counter is not null, except to increase it be 0.125. Therefore, the processing circuit 74 can remain idle, for example, seven passages of the logical channel without doing anything if the transmission occurs at 12.5 KHz.

If said decimal part is null, the circuit 74 communicates to the interface 78 the value of the bit 0 of the DATA1 field of the memory I and rewrites that field with a shift to the least significant bits. The counter is updated (+1 or +0.125 according to the frequency of the logical channel) as is the accumulated parity.

The interface 78 stores the value to be transmitted on the internal communication bus in memory M1 at the next occurrence of the logical channel. That value is stored in the buffer zone T of the M1 memory, and is retrieved from there at that next occurrence by the interface BCI 78.

This process continues until the counter reaches the value 31 thus indicating the end of the shifting of the word to be sent.

For the counter values ranging between 32 and 35, the processing circuit 74 provides the GAP information to the transmission circuit. For the value of 36 waits until the completion of the request previously placed in memory M2.

The completion of the request triggers a new transfer of the M2 memory to the M1 memory that results in the transmission of a new word on this channel.

The process of receiving is similar to that of the transmission. However, the counter is always incremented by +1 and the value to be processed is stored in the buffer zone T of the M1 memory where it has been placed by the interface 78 at the preceding passage of the logical channel. If this value is different from BID, it is stored in position 31 of the data zone DATA I before shifting and rewriting in the M1 memory. The error and parity information are updated in the same manner. If the value stored in the buffer is BID, no processing is required by circuit 74.

When the counter reaches the value 32 and the next data that differs from BID is a GAP, the transmission is considered terminated and the M2 memory is updated with a request for the DMA circuits, the data received, its parity and information about errors.

We will not describe the details of the structure of the processing unit. Since the current processing primarily determines the values to be inscribed in M1 and M2. We will, on the other hand, give in tables 4 and 5 hereafter, the details of the processing carried out according to the pertinent values originating from the current context. The specialist should have no difficulty to manufacture the logical circuit allowing the function of this processing.

One should first remember that the processing carried out depends on the following information:

In transmission, the processing depends on the value of the counter field of the M1 memory and on the request completion bit of M2 memory. The processing consists of determining the new values to be stored in the memories M1 and. M2, and to determine the bit to be sent (encoded as listed in table 3), based on the values of BIDO, GAPO and BIGO.

TABLE 3

| BIDO | GAPO | BIGO | Value Emitted |
|---|---|---|---|
| 1 | 0 | X | BID |
| 0 | 1 | X | GAP |
| 0 | 0 | 0 | 0 |
| 0 | 0 | 1 | 1 |

In receiving transmissions, processing depends on the value of the counting field of the M1 memory, on the value of the bit received, on the values of the bits 0, F2, R/A and S of the M2 memory and of the F1 bit of the M1 memory.

In tables 4 and 5 below, the following notation is used:

DATA1 <0>=bit 0 of the field DATA1

CPT1+1 (8)=incrementing the counter by "1" or "8" according to the frequency of transmission determined by the associated memory ML. That is an increment by +1 at 12.5 KHz and by +8 at 100 KHz which is a simple manner of representing the +0.125 and +1 previously mentioned, considering the counter as a whole number (integer). We have already described the process of incrementing of the counters of the M1 memory:

DATA 1=old value of DATA 1 shifted right;

A+B=or exclusive (parity calculation);

X=value unchanged or without importance;

BCIi=entering value;

BCIi, DATAI=shifting to the right and loading a bit in the left bit position.

Table 4 below provides the details of the processing in emission.

TABLE 4

| | | PROCESSING OF TRANSMISSION | | | | | |
|---|---|---|---|---|---|---|---|
| | | CPT1 <0:2> ≠ 0 | 0<CPT1<31 | CPT1 = 31 | 32<CPT1<34 | CPT1>35 | INIT |
| M1 | P1 | P1 | I⊕DATA1<0> | X | X | 0 | 0 |
| | DATA1 | DATA1 | $\overline{DATA1}$ | X | X | DATA 2 | 0 |
| | CPT1 | CPT1+1 | CPT1+1[8] | CPT1+1[8] | CPT1+1[8] | 0.$\overline{RA}$·CPT1+1[8].RA | 33 |

TABLE 4-continued

| | | PROCESSING OF TRANSMISSION | | | | | |
|---|---|---|---|---|---|---|---|
| | | CPT1 <0:2> ≠ 0 | 0<CPT1<31 | CPT1 = 31 | 32<CPT1<34 | CPT1>35 | INIT |
| | P2M | P2M | P2M | X | X | P2 | 0 |
| | F1 | X | X | X | X | X | 0 |
| BIT | BIDO | 1 | 0 | 0 | 0 | 0 | 0 |
| EMIS | GAPO | 0 | 0 | 0 | 1 | 1 | 1 |
| | BIGO | DATA1<0> | DATA1<0> | DATA1<0>. P2M + P1.P2M | DATA1<0> | DATA1<0> | DATA1<0> |
| M2 | P2 | INCHANGE | INCHANGE | INCHANGE | INCHANGE | INCHANGE | 0 |
| | DATA2 | | | | | | 0 |
| | 0 | | | | | | 0 |
| | R A | | | | | 1 | 0 |
| | F2 | | | | | INCHANGE | 0 |
| | S | | | | | INCHANGE | 1 |

The initialization of the counter is made at 33. This is also the case in receiving mode. This value has been chosen in order to simplify the logic, and can lead to the transmission of the GAPs that do not hamper transmission.

Regarding the column CPT1 35, the abbreviated notation corresponding to CPT1 indicates that the counter is usually incremented if RA is at 1 and is set at 0 if RA is at 0.

Moreover, the processing circuit 74 calculates the parity of the transmitted word. This parity is sent instead of bit 31 if bit P2 of M2 memory is at 1.

Lastly, the S bit is not managed by the circuit 74, except upon the initialization in transmission where the channel suspends itself. This bit is then never changed by the processing. This means, that in case of suspension by the DMA circuits, the word in the course of transmission, is terminated normally.

Table 5 below provides details about the processing in receive mode.

TABLE 5

| | | PROCESSING OF RECEPTION | | | | | | | | | |
|---|---|---|---|---|---|---|---|---|---|---|---|
| | | CPT1 < 32 | | | CPT1 = 32 | | | CPT1 > 33 | | | |
| | Valeur recue | GAP | BID | $\overline{GAP.BID}$ | GAP | BID | GAP.BID | GAP | BID | $\overline{GAP.BID}$ | INIT |
| M1 | P1 | 0 | P1 | P1⊕BCI1 | 0 | P1 | X | 0 | P1 | P1⊕BCI1 | 0 |
| | DATA1 | X | DATA1 | $\overrightarrow{BCI1,DATA1}$ | X | DATA1 | X | 0 | DATA1 | $\overrightarrow{BCI1,DATA1}$ | 0 |
| | CPT1 | 33 | CPT1 | CPT1+1[8] | 33 | CPT1 | 33 | CPT1 | CPT1 | 8 | 33 |
| | P2M | X | X | X | X | X | X | X | X | X | 0 |
| | F1 | 1 | F1 | F1 | 0 | F1 | F1 | F1 | F1 | F1 | 0 |
| M2 | P2 | INCH. | INCH. | INCH | P1 | INCH. | INCH. | INCH. | INCH. | INCH. | 0 |
| | DATA2 | | | | DATA1 | | | | | | 0 |
| | 0 | | | | RA | | | | | | 0 |
| | R A | | | | 1 | | | | | | 0 |
| | F2 | | | | F1 | | | | | | 0 |
| | S | | | | S | | | | | | 0 |

One will notice that the value of the bit sent is used to detect the errors of format. An error of format is detected if a GAP occurs in the middle of a word, or if a value other than GAP or BID occurs in the thirty-third position (i.e., word too long).

Moreover, if BID is received, no change occurs in the context of the channel, and it is simply ignored.

Lastly, the bit S does not result in the termination of the reception, but intervenes only at the level of the DMA circuits in order to mask the request. The suspension in reception thus causes some overwriting (bit 0 of the M2 memory).

We claim:

1. A process for the transmission of information data between a plurality of sub-components, in which each sub-component is associated with at least one logical channel, wherein each logical channel is associated with at least one physical channel, each sub-component addressing said logical channel with which it is associated, wherein different physical channels are time multiplexed on an internal communication bus, wherein at least one sub-component is further coupled with at least one input/output line, wherein said information data generated by a sub-component on said input/output line is re-transmitted on said internal communication bus to other sub-components, and said information data received by said sub-component on said input/output line is re-transmitted on said internal communication bus to said other sub-components.

2. A process for the transmission of information data between a plurality of sub-components, in which each sub-component is associated with at least one logical channel, wherein each logical channel is associated with at least one physical channel, each sub-component addressing said logical channel with which it is associated, wherein different physical channels are time multiplexed on an internal communication bus, wherein at least one sub-component is further coupled to at least one input/output line, said input/output lines functioning at a frequency that is a sub-multiple of a basic frequency, the functioning frequency of said internal communication bus being a multiple of said basic frequency.

3. A communication system for equipment comprising a plurality of sub-components in which at least one of said plurality of said sub-components includes at least one communication line, said communication line functioning at a frequency that is a sub-multiple of a basic frequency, said basic frequency being the same for each communication line, each sub-component further including at least one communications processor connected with said communication line, said communications processor of each sub-component being further coupled between each other by an internal communication bus on which are multiplexed a plurality of physical channels at a multiple frequency of said basic frequency.

4. The communication system according to claim 3 wherein at least one sub-component comprises one central unit and one memory coupled by a local bus, said communications processor of said sub-component being further coupled to said local bus.

5. The communications system according to claim 4 wherein each central unit is designed to exchange with said communications processor via said local bus information data linked to numbers of logical channels independent of the physical channels, said communications processor being designed to associate one logical channel of the central unit to one physical channel of the internal communication bus.

6. A communication system for equipment comprising a plurality of sub-components in which at least one of said plurality of said sub-components includes at least one communication line, said communication line functioning at a frequency that is a sub-multiple of a basic frequency, said basic frequency being the same for each communication line, each sub-component further including at least one communications processor connected with said communication line, said communications processor of each sub-component being further coupled between each other by an internal communication bus on which are multiplexed a plurality of physical channels at a multiple frequency of said basic frequency, wherein the internal communication bus is one link to a plurality of cables, a first cable carrying a synchronization signal of said basic frequency, a second cable carrying a clock signal indicating the changes of physical channels, and the other cables carrying information data.

7. The communication system according to claim 6 wherein each communications processor has a counter of physical channels capable of being incremented by said clock signal and of being reset at zero by said synchronization signal for the determination of physical channel numbers.

8. The communication system according to claim 7 wherein each communications processor has an internal clock and a phase generator in order to link the incrementation input of its physical channel counter, either to a clock signal of said internal communication bus or to its internal clock, said phase generator for providing a synchronization signal, and means being provided in order to selectively link up the synchronization signal of said phase generator with said synchronization cable of said internal communication bus, one of said communications processors of said system having its internal clock coupled to said clock cable of said internal communication bus, and synchronization signal of its phase generator coupled to said synchronization cable of said internal communication bus, and each processor having said incrementation input of its physical channel counter coupled to said clock cable of said internal communication bus and its input of zero resetting coupled to said synchronization cable of said internal communication bus.

9. A communications processor between a plurality of sub-components of an equipment comprising:

a first linkage means coupled to a first sub-component of said equipment and at least one of a number of logical channels, said first linkage means designed to exchange information data between said first sub-component and said at least one of a number of logical channels;

a second linkage means coupled to said first sub-component and at least a second sub-component of said equipment, said second linkage means designed to exchange said information data between said first sub-component and said second sub-component during a period of successive occurrences of a physical channel, a group of physical channels following each other at one frequency and according to a predetermined order; and association means to associate each logical channel to at least one physical channel.

10. The communication processor according to claim 9 wherein said linkage means to said first sub-component comprises a linkage unit to a central unit of said first sub-component.

11. The communication processor according to claim 19 wherein said first linkage means coupled to the first sub-component comprises direct access means to a memory of said first sub-component.

12. The communications processor according to claim 11 wherein said direct access means comprises means for forming an address of said memory of said first sub-component at least according to said number of the logical channel associated with said information data, a memory containing information on the functioning mode of said logical channel, and means for reading or writing said information data to said address according to said information on the functioning mode of the logical channel.

13. The communications processor according to claim 12 wherein said address formation means are designed to form said address equally according to one part of the exchanged information data.

14. The communications processor according to claim 9 wherein said first linkage means comprises one exchange memory in which each memory zone is allocated to one logical channel, said first linkage means is designed to contain either the information data originating from said first sub-component that is destined through said second linkage means to the second sub-component or information data originating from said second linkage means and destined for the first sub-component, according to the functioning mode of the logical channel under consideration and to contain an information of request/fulfillment.

15. The communications processor according to claim 14, comprising means for giving a first value to said information of request/fulfillment when a word originating from said second linkage means has been placed in said memory zone at the disposal of said first linkage means or when a word placed in said memory zone by said first linkage means has been read for transmission to said second linkage means, according to the functioning mode of said logical channel associated with said memory zone, and means for giving a second value to said information of request/fulfillment when the word put at the disposal of said first linkage means has been read by the first linkage means or, respectively, when a new word has been placed in said memory zone by said first linkage means for transmission to said second linkage means.

16. The communications processor according to claim 15 wherein said linkage means to said first sub-component comprises an address counter in order to successively address each memory zone of said exchange memory, said means for reading said memory zone, said means for analyzing said value of the information of request/fulfillment contained in said zone and for the stopping of said address counter as said information of request/fulfillment has its first value, and means in order to, in that case, and according to the functioning mode of said logical channel associated with memory zone, to place in said zone a new word in view of its transmission to said linkage means to said second sub-component or to transmit to the first sub-component the word read, and in order to give its second value to said information of request/fulfillment.

17. The communications processor according to claim 14 wherein said linkage means to said first sub-component comprises one configuration memory of said logical channels wherein every zone is linked to a logical channel by said linkage means to said first sub-component, said configuration memory being addressed in synchronism with said exchange memory.

18. The communications processor according to claim 9 wherein said association means comprises one physical channel counter and one association memory where each memory zone is addressed by said physical channel counter, and is designed to contain at least the number of a logical channel associated with the corresponding physical channel at the value of said counter.

19. The communications processor according to claim 18 wherein each memory zone of said association memory is moreover designed to contain an information indicating if said physical channel corresponding to said zone is actually associated with a logical channel.

20. The communications processor according to claim 18 wherein each memory zoned of said association memory is moreover designed to contain an information on the functioning mode of the logical channel associated with said physical channel corresponding to said value of said counter.

21. The communications processor according to claim 9 wherein said linkage means to said second sub-component comprises a context memory wherein each zone is linked to a logical channel, and is designed to contain at least one word in the course of processing on the corresponding logical channel.

22. The communications processor according to claim 21 wherein each memory zone of said context memory is further provided with a memory location forming a counter in order to contain a position of a next bit to be processed in the word in the course of said processing.

23. The communications processor according to claim 21 wherein each memory zone of said context memory additionally comprises a location of memory capable of receiving said value of said next bit to be transmitted or of the last bit received.

24. The communications processor according to claim 9 wherein said linkage means to said second sub-component comprises a processing unit designed to receive from a context memory, at each occurrence of a physical channel, data related to the context of said logical channel associated with that physical channel, said data comprising at least one word in the course of processing on said logical channel, and a linkage interface between said processing unit and said second sub-component, said processing unit being designed to update at each of said occurrences, said data relating to the context according to at least one information exchange with said interface.

25. The communications processor according to claim 24 wherein said linkages between said processing unit and said memories are parallel linkages, and said linkage between said processing unit and said interface is a serial linkage.

26. The communications processor according to claim 24 wherein said memories are addressed by an output register of an association memory that itself is addressed by a physical channel counter.

27. The communications processor according to claim 9 wherein said linkage means to said second sub-component comprises a processing unit linked by said linkage means to said first sub-component through an intermediary means of an exchange memory wherein each memory zone is linked to a logical channel and is designed to contain at least one word of information to be exchanged with said linkage means to said first sub-component, and an request/fulfillment information, and a linkage means between said processing unit and said second sub-component, said processing unit being designed, when said request/fulfillment information has a certain value, to exchange a word of information with said exchange memory, and to give another value to said request/fulfillment information, and, according to the functioning mode of the logical channel, to transmit said exchanged word to said interface or to receive from said interface a new word to be exchanged.

* * * * *